(12) United States Patent
Hu et al.

(10) Patent No.: US 11,854,307 B2
(45) Date of Patent: Dec. 26, 2023

(54) MULTI-TARGET DETECTION AND TRACKING METHOD, SYSTEM, STORAGE MEDIUM AND APPLICATION

(71) Applicant: Harbin Institute of Technology, Weihai, Weihai (CN)

(72) Inventors: Xin Hu, Weihai (CN); Deqiong Ding, Weihai (CN); Zhengzuo Li, Weihai (CN); Zhiyuan Zhou, Chongqing (CN); Dianhui Chu, Weihai (CN)

(73) Assignee: HARBIN INSTITUTE OF TECHNOLOGY, WEIHAI, Weihai (CN)

( * ) Notice: Subject to any disclaimer, the term of this patent is extended or adjusted under 35 U.S.C. 154(b) by 154 days.

(21) Appl. No.: 17/516,725

(22) Filed: Nov. 2, 2021

(65) Prior Publication Data
US 2022/0309835 A1  Sep. 29, 2022

(30) Foreign Application Priority Data
Mar. 26, 2021 (CN) .......................... 202110323372.8

(51) Int. Cl.
*G06V 40/20* (2022.01)
*G06T 7/277* (2017.01)

(52) U.S. Cl.
CPC .............. *G06V 40/25* (2022.01); *G06T 7/277* (2017.01); *G06T 2207/10028* (2013.01); *G06V 2201/07* (2022.01)

(58) Field of Classification Search
CPC .... G06V 40/25; G06V 2201/07; G06T 7/277; G06T 2207/10028
See application file for complete search history.

(56) References Cited

U.S. PATENT DOCUMENTS 5,594,856 A * 1/1997 Girard ..................... G06T 13/40
345/473
6,144,385 A * 11/2000 Girard ..................... G06T 13/40
345/473

(Continued)

FOREIGN PATENT DOCUMENTS

EP           2521094 A1 * 11/2012  ......... G06K 9/00335

OTHER PUBLICATIONS

Hong et al., "Quadrotor path planning using A* search algorithm and minimum snap trajectory generation" (pp. 1013-1023) (Year: 2021).*

*Primary Examiner* — Manav Seth
(74) *Attorney, Agent, or Firm* — WPAT, P.C.

(57) ABSTRACT

In the multi-target detection and tracking method, lidar (2D laser scanner) scans point cloud data of surroundings and transfers the collected data to the edge server. Then, the edge server uploads the data to the cloud. After obtaining the lidar data, point clouds of footsteps are extracted through dynamic point extraction, point clustering, and random forest model, respectively. Footsteps are matched to form human tracking trajectory by using trajectory matching. After the tracking process, the walking information is published to the users, in a visual form. Meanwhile, the gait parameters are saved into files, including walking speed and step length, when human is detected. Comparing to the visual sensor based human tracking methods, the present invention employs lidar to avoid the interference of ambient light, which leads to easier implementation and larger universality, especially for multi-target scenarios.

20 Claims, 11 Drawing Sheets

(56) References Cited

U.S. PATENT DOCUMENTS

| | | | | |
|---|---|---|---|---|
| 6,493,652 | B1* | 12/2002 | Ohlenbusch | G04G 21/025 |
| | | | | 702/144 |
| 6,876,947 | B1* | 4/2005 | Darley | A61B 5/1118 |
| | | | | 702/144 |
| 7,983,448 | B1* | 7/2011 | da Vitoria Lobo | G06V 40/28 |
| | | | | 382/199 |
| 8,712,725 | B2* | 4/2014 | Darley | A61B 5/6807 |
| | | | | 600/300 |
| 9,575,564 | B2* | 2/2017 | Wells | G06F 3/0488 |
| 9,586,316 | B1* | 3/2017 | Swilling | B25J 9/1664 |
| 11,225,294 | B1* | 1/2022 | Stephens | B62D 57/032 |
| 11,413,750 | B2* | 8/2022 | Swilling | B62D 57/032 |
| 11,580,785 | B1* | 2/2023 | Kundu | G06V 10/764 |
| 11,647,805 | B2* | 5/2023 | Busbee | B29C 64/209 |
| | | | | 73/172 |
| 11,648,672 | B2* | 5/2023 | Yutaka | A63F 13/327 |
| | | | | 345/634 |
| 11,654,985 | B2* | 5/2023 | Stephens | G05D 1/0891 |
| | | | | 700/250 |
| 11,665,284 | B2* | 5/2023 | Jorasch | H04N 21/44008 |
| | | | | 709/204 |
| 2022/0030759 | A1* | 2/2022 | Rovira Mas | G05D 1/0255 |
| 2022/0108561 | A1* | 4/2022 | Groβ | G06V 40/25 |
| 2022/0143467 | A1* | 5/2022 | Green | A63B 22/025 |
| 2022/0331028 | A1* | 10/2022 | Sternitzke | A61B 5/1176 |

* cited by examiner

MULTI-TARGET DETECTION AND TRACKING METHOD, SYSTEM, STORAGE MEDIUM AND APPLICATION

CROSS REFERENCE TO THE RELATED APPLICATIONS

This application is based upon and claims priority to Chinese Patent Application No. 202110323372.8, filed Mar. 26, 2021, the entire contents of which are incorporated herein by reference.

TECHNICAL FIELD

The present invention belongs to the object detection and tracking field, and particularly relates to a multi-target detection and tracking method, system, storage medium and application.

BACKGROUND

Currently, the detection and tracking of targets are an important and basic task in the field of computer research. There are many applications of computer-related technology in the detection targets, and wide application in various industries, such as image recognition, vehicle detection, and intelligent monitoring. There are also many solutions for tracking targets, such as commonly used computer vision detection. The detection scheme based on the visual sensor is more intuitive and accurate, and the development is also relatively mature. However, it also has many shortcomings, such as greatly affected by light, difficult to distinguish mixed multi-target objects, big consumption of resources. Lidar is an active range sensor, which can be relatively stable to scan surrounding objects. As a result, the lidar will not be affected by the environment or light changes. At the present stage, the aging of population is a severe challenge to the whole world. The demand of services for the aged becomes urgent. In this context, footstep tracking and gait analysis play an important role in services for the aged. Through the monitoring of the elderly's walking, the status of older adults can be fully understood in real time, which can reduce sudden risks dramatically in daily living. At the same time, a more comprehensive analysis of the behavior and health status of the elderly can be conducted by combining to other analysis systems, like Parkinson's disease risk analysis system and stroke risk analysis system.

In the field of computer research, target detection and tracking are important and fundamental tasks. In target detection and tracking area, human sense is a window and bridge of communication with the outside world, which can recognize the surrounding objects, explore the connections among these objects, and establish correspondence between human mind and outside world. For example, the visual system is the most important source of human perception, and the most important access to external information. However, due to limited human energy and restricted human vision, the application of human vision is greatly limited in various fields. With the rapid development of computer technology, improving human defects by enabling computer to handle sensing information, has become a very attractive research topic. Now, target identification and extraction, like the present invention, have been widely used in our daily living, such as vehicle detection, abortion statistics, and intelligent monitoring. The target tracking technology will deeply change the society, facilitate the investigation, and improve the safety of the society.

Existing target identification can be performed using many computer methods, such as computer vision, enabling the computer to perceive geometric information of objects in the environment, including their shape, position, posture, movement, etc., and to describe, store, identify and understand them. Visual perception can handle more complex color information is not expensive. However, there are several defects in real-time related issues, and in complex environment perception.

The advantage is unique by using lidar for target detection and tracking. Different from visible light and infrared sensors, lidar is an active sensor with small external interference, large detection range and high ranging accuracy, which can obtain the range (coordinate) information of the target surface in the external environment quickly and accurately, so as to detect, identify and track the target successfully. Comparing with computer vision procedures, lidar based tracking method is more robust to the external environment and light, faster for calculating, and more convenient for implementation. Now, lidar based tracking is widely used in military, industry, and daily living. In the military, laser radar, as a high-sensitive radar, plays an important role in battlefield reconnaissance, gas detection, and accurate tracking. In civil terms, the application of lidar is used throughout social services and scientific research, such as danger forecast, meteorological observation, and traffic control. Lidar has a great market in the transportation field, many vehicles cannot be navigation from lidar. Lidar technology also has many applications in medicine research. For example, optical low coherence tomography, which originated from the wide application of laser reflector.

In the field of smart elderly care, the gait analysis plays a pivotal role. A lot of human health status information can be discovered, by looking into the gait parameters. Now, the aging of the population is serious. The rapid aging of society is becoming a heavy social burden. The elderly accounts for a significant proportion, who lives alone. For these elderly people, their health is in a precarious state without being cared. If severe condition occurs, it can be fatal for the elderly without immediate detection and assistance. Therefore, the invention considers whether there is a simple and feasible method based on target tracking, which can monitor the indoor movement of the elderly.

As an active sensor of autonomous environment sensing, lidar (laser radar) has been developed rapidly since 1990s. Laser radar relies on the laser beam emitted by itself to directly obtain three-dimensional depth information of the environment, and has the advantages of not being affected by light, little interference from the outside, stable and reliable, so it has been widely used in automobile, mobile robot and other fields. In the complex dynamic environment, how to achieve stable and reliable moving target tracking has always been one of the important research objectives of autonomous vehicle dynamic environment perception. There are many experimental applications of target detection based on laser radar. The laser radar installed on cars and robots can accurately identify the surrounding objects. In the field of intelligent driving, 3D point cloud information obtained by laser projection scanning and SVM support vector machine algorithm are used to analyze the real-time behavior of dynamic objects or pedestrians, which can complete the real-time detection of roadside environmental targets in autonomous driving. These researches are based on 3D radar, and the data information processing is relatively complicated.

The application of lidar for pedestrian detection has already been established. Shackleton J et al. implemented the monitoring system using 360° Lidar and proposed new solutions to three major problems. Classification and matching between multiple objects, division between people and fixed objects in the scene, and division between objects that are very close to each other. Huijing Zhao et al from Peking University and University of Tokyo cooperated in 2005 to use lidar based tracking scheme to conduct pedestrian statistics and tracking in crowded places such as subway stations, which shows that lidar has unique advantages and feasibility in pedestrian tracking. In addition, there are many other studies on object-tracking, such as the research project of Thomas Dieterle et al at the University of Erlangen-Nuremberg, which integrates Lidar and RGB-D lens to achieve multi-target tracking. In this study, the visual aided lidar was used for research verification, which made up for the deficiency of single equipment method. Karl Granstrom, Marcus Baum, Stephan Reuter et al., in their research, pointed out two basic and good target tracking methods: The random matrix and The Kalman filter, these methods are also frequently used in relevant studies, with very high practicability and reference value. Taipalus T, Shackleton J et al. proposed that lidar should be placed at the height of knee joint in their study of radar monitoring pedestrian walking state, and established a human leg model in the study, pre-setting the distance between legs, circumference, floor area and other parameters. This method makes the system have strong identification ability and greatly reduces the measurement error to a certain extent.

In recent years, the research based on lidar emerges in an endless stream, and the application field of lidar is more and more extensive. Due to the rise of robot research, moving target detection and tracking is one of the difficult problems in mobile robot research. Lidar is a commonly used sensor in robot navigation. Based on robot localization of ROS and laser radar navigation system, JiaXin Shou at Tongji University proposed that the system adopts the raspberries pie controller as control core platform, using laser radar acquisition environment information, under the ROS distributed framework for the development of software algorithm, implement SLAM function, based on scan matching algorithm based on particle filter algorithm of navigation. Similarly, Jin-xia and Yu et al studied the problem of mobile robot motion target detection and tracking based on 2D laser radar performance, on the basis of analysis and filter design, and put forward a kind of independent moving target detection and tracking methods, mainly through the k-neighbor clustering analysis was carried out on the laser radar scanning obstacle; based on grid map matching method assess the motion parameters of barriers, an improved particle filter algorithm was proposed to evaluate the motion state of the target. In the study of pedestrian tracking, Can Wang et al. used mainstream clustering and Kalman filter algorithm to realize real-time tracking of indoor pedestrians in the study of target tracking method based on lidar robot. Shiyang Song proposed lidar target tracking based on sparse learning.

All in all, lidar based target tracking has strong practicality and simplicity. Compared with the target tracking based on computer vision, the tracking algorithm based on lidar is simple, with strong real-time performance, more emphasis on distance information and less interference from the external environment. If the environment is complex and multiple targets are fused together, it is difficult for computer vision processing to distinguish target from complex environment. However, lidar also has its own shortcomings, it can only simply obtain the distance information of the environmental point. Since the information is relatively monotonous, it is difficult to do multi-level analysis. Therefore, the joint operation of multiple sensors is required, which can make up for the deficiency and greatly improve the target recognition and tracking effect. Now, the development direction on lidar based detection tends to be large angle of view, multi-scene, multi-target, multi-sensor combination, etc. Under the increasingly severe situation of global aging, it is very meaningful to provide health care services for the elderly. The purpose of the invention is to track and monitor indoor elderly people by using the target tracking method in the field of computer. As an important research direction, target tracking has many application fields in all walks of life, and also has many feasible schemes. The existing target tracking systems have their own characteristics, and also defects. Based on vision sensors, target tracking can detect subtle colors, textures, and a detailed perception of the environment. And lidar based target recognition and tracking is less affected by the environment, since the range data is reliable and stable, and the algorithm is fast and convenient, which is suitable for real-time tracking.

Now, target tracking technology in computer field still has many issues and challenges. At the technical level, problems such as how to deal with the complex monitoring environment, how to continuously adopt effective detection algorithm for high frequency, and how to improve the reliability and accuracy of detection and tracking remain to be solved. In the social aspect, the computer vision-based monitoring and recognition may cause a series of social problems such as privacy issue. What more, the cost of real-time monitoring is very high, such as the cost of a lens sensor, etc. Through the above analysis, the problems and defects of the existing technology are as follows:

(1) Now, several challenges in target tracking need to be solved, such as how to deal with the complex monitoring environment, how to continuously adopt effective detection algorithm for high frequency, and how to improve the reliability and accuracy of detection and tracking.

(2) The computer vision-based monitoring and recognition may cause a series of social problems, such as privacy issue. The cost of real-time monitoring is very high.

The difficulty of solving the above problems and defects is as follows: daily living situation is more complicated than lab environment. First, the indoor environment is very complex, with many obstacles scattered in various parts of the room. What more, the activities of older adults in daily living are more complicated than that in the lab. The countermeasure to be taken is improving the clustering part. After the completion of the original clustering algorithm, delete the point set with too few points in the set, so as to avoid the interference of some scattered points. In the tracking part, the Kalman filter is used to maintain the prediction state for a period of time. When the footsteps are seriously blocked or even disappeared, the prediction results will be used to complete the tracking. Secondly, the occlusion of detection target is serious. Since lidar can only be placed at the edge of room, the original perspective is not as wide as placed in the middle of environment, it is severely affected by the environment changes. In many scenes, some footstep points are very short or sparse, which greatly increases the judgment error of the random forest on footstep detection. These clustering sets have basically lost some features, that should be associated with a person's footstep, such as the length of footstep. Even worse, the number of scanned footpoints is small or too sparse, clustering procedure may ignore them. Therefore, in the matching of human feet, if there is no suitable match for a single foot, human tracks can also be formed. Situations, not moving or sitting down for long periods of time, are also considered. After the scanning recognizes the footsteps of person, continuous tracking will be carried out. If the footsteps stop walking, the track tracking state will be maintained. At the same time, when matching the human footstep track, it is not required that both feet have traveled a certain distance, that is, it can be judged as matching the human footstep track.

Solving the above problems and defects is of great social significance. Under the challenge of population aging, it is a very practical and promising research topic to use computer technology to help the elderly reduce health risks and social burden. The invention is based on lidar (laser radar), which means low cost, simple operation, light and compact, and little influence on daily life. Monitoring the walking status of the elderly can not only facilitate the understanding of the living status of the elderly, avoid possible risks in daily life, but also obtain the gait parameters of the elderly, which can further carry out a comprehensive analysis of the health status of the elderly. In summary, the invention has the advantages of easy operation, practicability, and expansibility, and has more far-reaching significance for the gait analysis of the elderly in the health care field.

SUMMARY

Aiming at the problems existing in the prior art, the invention provides a multi-target detection and tracking method, a system, a storage medium and an application.

The invention is implemented in this way, which is a multi-target detection and tracking method. The multi-target detection and tracking method comprises: Point cloud data is scanned by lidar, and the collected data is transferred to the edge server and uploaded to the cloud storage.

After obtaining point cloud data, the footstep points are extracted by dynamic point extraction, point clustering and random forest, respectively. The clustered points are fed into trajectory matching for track footsteps.

After processing the point cloud data and obtaining the footstep information of targets, the results are released to users in the form of visualization. At the same time, when human is detected, relevant walking information will be output and saved to files, including walking speed and footstep length information.

Further, the multi-target detection and tracking method saves the data scanned by the lidar, into a file and uploads it to the cloud, while the user can download the data file to be analyzed directly from the cloud gateway.

Further, the multi-target detection and tracking method needs to adopt the clustering method for the extracted dynamic points, so that the single distributed points form clusters with certain rule conditions, and the center point of the cluster is analyzed as the target point. The machine learning model is used to identify and classify human footsteps, and the footstep points are extracted. The tracking algorithm is used to track the footsteps, and the latest state of each footstep is obtained. Combined with the previous state information, the accurate predicted state of each footstep point is updated by the Kalman filter. Finally, the two trajectories of one person are matched to generate one walking trajectory, for display.

Further, the lidar ranging core of the multi-target detection and tracking method rotates clockwise, to realize the 360° omni-directional scanning of the surrounding environment and obtain the plane point cloud information of the space, where it is located. The lidar is mounted at the bottom of the scene against a wall near the power.

The data receiving and uploading of lidar are implemented by Rosbridge_server service. Rosbridge_server runs on a Raspberry Pi computer, and the corresponding port is designated as the server end. At the same time, the client program runs on another Raspberry Pi computer, connected to the corresponding ROS port, receiving the corresponding topic, and then the message data content in the topic is published in the JSON format. Finally, the data is saved into files and uploaded to the cloud storage, which are named after time.

After the acquisition and uploading of the point cloud data, the range data is saved into cloud. The Range data can be packaged and downloaded from the smart gateway. Intelligent gateway program is a web page program based on JavaSpringBoot framework. The downloading process can be simple: open the web page, wake the gateway, choose the data type, and select the data time.

Further, after the point cloud data information of lidar is obtained by the multi-target detection and tracking method, it is preliminarily processed, and target footsteps are finally identified, including:

(1) Lidar data analysis: A scan frame contains 360 points, which are the obstacles the laser encounters. The lidar emissions laser every 1°. The point location information is a range array in float type, which represents the distance value of each obstacle encountered. The range array preserves the distance between each point and the center of the range map, which is in meter unit. The increasing emission angle is implied in the order of range array. The frequency of lidar represents the number of scanning frame every second. The lidar we use has a a frequency of 6 Hz, which means 6 frames every second.

According to the conversion rule from the polar coordinate and the rectangular coordinate, the range data can be convert to position information in the rectangular coordinate, by using formula $$\begin{cases} x = \rho \cdot \cos\theta \\ y = \rho \cdot \sin\theta \end{cases},$$

where (x, y) is the position information in the rectangular coordinate, and ($\rho$, $\theta$) is the position information in the polar coordinate. Each frame of range data is published to a corresponding ROS node for subsequent analysis;

(2) Dynamic point extraction: The dynamic points are extracted by using the following procedure: comparing range data frame by frame, calculating distance difference of the 360 corresponding points for adjacent frames, calculating the distance difference sum of the 360 points, and calculating the mean value of difference sum in a period of time; Within a given time period, the range data of surroundings is considered as static, when the mean value of difference sum is smaller than a given threshold. Then, the mean value of the range data in this period is saved as static environmental map for further use; Meanwhile, the edge server keeps getting range data from the lidar. The frame difference algorithm keeps to check whether the surroundings are stationary, as the range data accumulates; If the surroundings keep static, the surrounding map updates per hour, to avoid the measurement drift.

(3) Point clustering: Density clustering procedure is employed to connect all the adjacent points with high-density into a point cloud. For different density, clouds are separated into different clusters. Please notice that, DBSCAN leads to weak clustering accuracy, for range data with large distribution differences among clusters. After the density clustering procedure, clusters with small number of points are removed for computational efficiency. For each frame, the range data is processed by using the proposed dynamic point extraction and point clustering algorithm. The obtained dynamic point cloud is given a domain parameter and saved as sample sets. The sample sets are processed by DBSCAN clustering, to remove small clusters. Finally, several point clusters can be obtained for each frame;

(4) Point cloud feature extraction: After the point clustering, point clusters are considered as footstep candidates, waiting for footstep tracking. Before footstep tracking, several footstep features are designed for footstep identification, as following:

1) Cluster center point: The central point of each cluster is the representative point of all points in this cluster, which is defined as the coordinate average of all the point in the cluster.

2) Cluster distance range: The length of human foot varies within a reasonable range, which is 0.14 m. And the cluster distance range is defined as:

$$F_d = |p - p_c| < 0.14 \text{ m}$$

where $|\cdot|$ is the $L_2$ norm, $p=(x, y)$ is represents a point in the point cluster, x and y are the coordinate, $p_c$ is the cluster center; When the cluster distance range is smaller than 0.14 m, this point cluster is regarded as footstep candidate.

3) Footstep length: Footstep length varies in a large range. However, it can link two steps in the walking, which is defined as following:

$$F_l = \max_{\forall f,b} |p_f - p_b|$$

where $p_f$ and $p_b$ are two arbitrary points in two clusters of two adjacent frame, which is roughly assumed as the largest distance between two clusters of two adjacent frame.

4) Foot arc: The laser scanner can capture the foot silhouette in one direction. The point cluster of this foot silhouette is assumed to have arc shape, as shown in FIG. 5, which is defined as the mean value of adjacent radian in the cluster, as following:

$$F_c = \frac{1}{n-1} \sum_{i=2}^{n} a\cos \frac{|p_i - p_c|^2 + |p_{i-1} - p_c|^2 - |p_i - p_{i-1}|^2}{2|p_i - p_c| \cdot |p_{i-1} - p_c|}$$

where $p_i$ and $p_{i-1}$ are two adjacent points in the cluster, $p_c$ is the cluster center, n is the point number in the point cluster.

5) Foot arc length: The total length of the foot silhouette is defined as foot arc length, as following:

$$F_a = \sum_{i=2}^{n} |p_i - p_{i-1}|$$

where $p_i$ and $p_{i-1}$ are two adjacent points in the cluster.

(5) Random forest model for footstep identification: After extracting dynamic points, each point cluster is fed into the random forest model to identify feet from other objects, by using the proposed features. The output of trained random forest model is two classes, foot and non-foot. The identification results are published on corresponding nodes for subsequent processing.

The multi-target detection and tracking method is characterized by the fact that, the process of footstep tracking of the multi-target detection and tracking method comprising maintaining a tracking trajectory for each tracking target. As the footstep information exposed on one node, the footstep location is used to update the tracking trajectory. An overhead matrix is constructed to preserve the Mahalanobis distance, between the footstep location and each tracking trajectory, by matching the footstep information with each tracking trajectory. The overhead matrix represents the possibility of the footstep belongs to the trajectories. The smaller the Mahalanobis distance in the overhead matrix is, the larger the possibility represents. The overhead matrix is optimized to maintain local minimum, by assigning each footstep to a trajectory. After assigning, the remaining steps are signed to new trajectories. The footstep information with assigned trajectory is fed into Kalman filter, to update the footstep information. Then, trajectories with low confidence coefficient will be removed; the obtaining left and right footstep trajectories are registered to each other, for footstep-track matching, to generate target (person) trajectories. Please notice that the two pairing trajectories can fine tune each other. Finally, the information of target trajectories and footstep trajectories are released on corresponding node, while trajectories and gait parameters are shown in visual form;

(1) Step-track matching: Mahalanobis Distance is considered as a correction of Euclidean distance, which can correct the related problems of inconsistent dimension in Euclidean distance. For two trajectories waiting for matching, the point clouds of these two trajectories obey the same distribution. The deviation of the associated covariance matrix is defined as the Mahalanobis Distance between two trajectories, as following:

$$D_M(x,y) = \sqrt{(x-y)^T \Sigma^{-1}(x-y)}$$

where x and y represent two random points of the two trajectories, E is the covariance matrix;

(2) The Kalman filter state update process: Footstep tracking is constructed as a dynamic system, whose status can be updated by using the Kalman filter. The Kalman filter state update process can be described as following:

$$X_k = A_k X_{k-1} + B_k u_k + w_k$$

$$z_k = H_k X_k + v_k$$

where X presents the footstep status in the tracking trajectory, $X_k = [x_k, y_k, x_k', y_k']$ is the centroid state vector of one tracking trajectory in frame k, the Kalman model updates the tracking status every scan frame, k and k−1 present two adjacent frame; A is the state transfer matrix; B the input control matrix, which maps the walking information into the state vector; u is the system control vector, including acceleration information of foot; w is process noise; H is the transition matrix, which maps the state vector to the measurement space (mahalanobis space); v is the observation noise.

Another purpose of the invention is to provide a computer readable storage medium, containing a computer program, which is executed by a processor as the following steps:

The lidar scans the surroundings into point cloud data. The gateway transfers the data to the edge server. And the edge server uploads the data to cloud storage then.

With the obtained point cloud data, footstep points are extracted and tracked by going through dynamic point extraction, point clustering, point cloud feature extraction, random forest identification, multi-target detection and tracking, footstep-track matching, and Kalman filter updating.

With the processed cloud point data, gait information can be obtained, which is published to the users in a visual form; Meanwhile, as human is detected, corresponding gait information is output and stored in files, including walking speed and step length.

Another purpose of the invention is to provide a multi-target detection and tracking system, which implements the multi-target detection and tracking method. The multi-target detection and tracking system comprises: Lidar module, including operation of lidar for lidar drive and upload of acquired data.

Data acquisition module is used to obtain lidar point cloud data and download acquisition using intelligent gateway download platform.

Data processing module, for the processing analysis of point cloud data, and the presentation of the processing results.

Furthermore, the multi-target detection and tracking system takes lidar as the source of original data. The Raspberry Pi computer drives the lidar and makes it as the raw data source; The Raspberry Pi computer opens a rosbridge-server port, runs "client" program to establish connection with the ROS node published by the lidar, and obtains the raw data through ROS message named scan. The raw data is transferred to the edge server, which is another Raspberry Pi computer, and then uploaded to the MinIO cloud. The user can operate the tracking system for gait analysis by choosing the time period of the required data. The tracking system, runs on a host PC, downloads the required data and processes by using the proposed procedure and algorithm. Finally, the walking parameters are obtained and used for visual display of tracking result.

Another purpose of the invention is to provide an information data processing terminal, for realizing the multi-target detection and tracking method. The information data processing terminal includes: image recognition terminal, footstep detection terminal, intelligent monitoring terminal, elderly walking monitoring terminal.

For the proposed technical schemes, the advantages and positive effects of the invention are as follows: the invention mainly focuses on how to monitor indoor pedestrians effectively by using laser radar. In order to achieve this goal, it is necessary to select appropriate programs, taking the indoor monitoring environment into account, privacy issue, and feasibility. The invention identifies and tracks indoor human targets, based on laser radar and other necessary hardware devices. The laser radar will scan and obtain point cloud data in a plane. The invention needs to address how to obtain effective information through the distance data of the plane, and separate the human footsteps from the background environment. Finally, the recognized footsteps need to be continuously tracked. The invention employs laser radar to detect and track targets of the elderly in indoor environment, and extracts several gait physical characteristics. Lidar has the advantages of low cost, good effect and wide range of use. It plays an irreplaceable role in the detection of target position and movement in industry, military and civil fields. Through a series of processing of point cloud data formed by laser radar and using Kalman filter to update the status of the movement process, the system can form accurate recognition and tracking of the footsteps of the elderly indoors. Compared with visual sensor based human tracking, the lidar based tracking of the invention has the advantages of being free from environmental interference, easy implementation and suitable for use in multi-target scenes. The invention has been verified in the laboratory environment and the real free living environment of the elderly, and the ideal effect can be obtained.

BRIEF DESCRIPTION OF THE DRAWINGS

In order to clearly explains the application example of technical plan, a brief introduction of the attached drawings used in this application embodiment is given below. Obviously, the drawings described below are only some embodiments of this application, from which other drawings can be obtained without creative effort by ordinary technicians in this field.

In FIG. 2, 1. Lidar module; 2. Data acquisition module; 3. Data processing module.

DETAILED DESCRIPTION OF THE EMBODIMENTS

In order to make the purpose, technical scheme and advantages of the invention more clear, the invention is further described in detail in combination with embodiments as follows. It should be understood that embodiments described herein are intended only to explain and not to qualify the invention.

Addressing the problems existing in the prior art, the invention provides a multi-target detection and tracking method, system, storage medium and application. The following is a detailed description of the invention in combination with the attached drawings.

Figure 1:
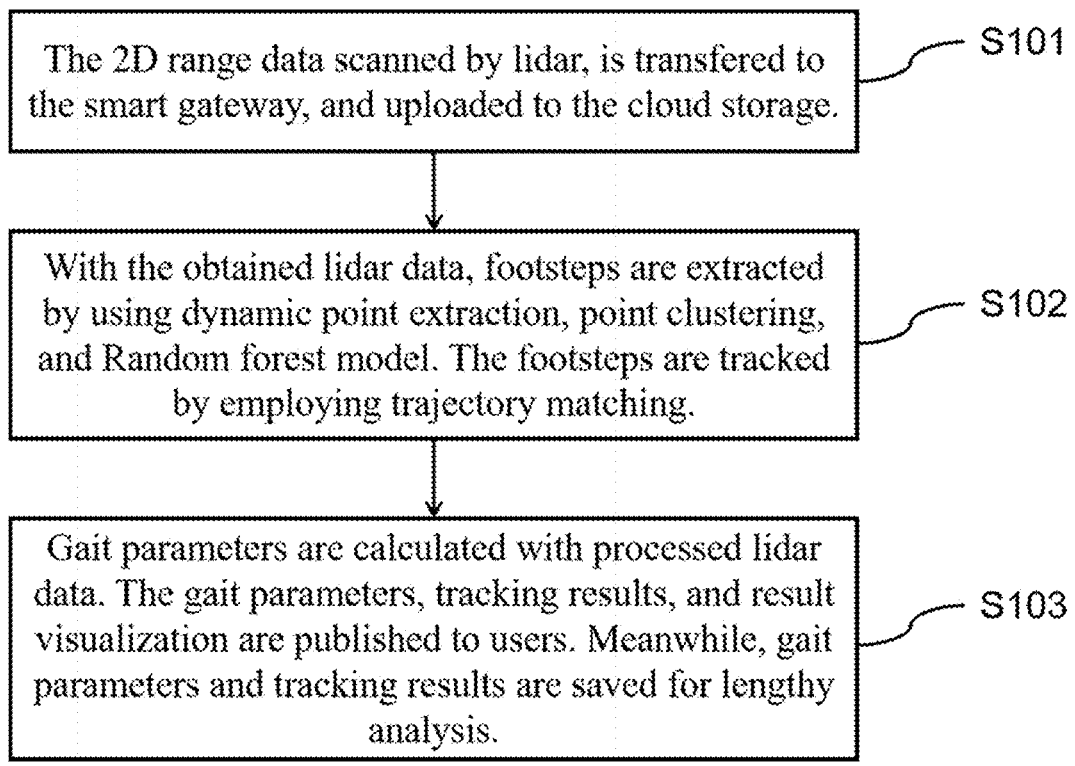
FIG. 1 is a flowchart of a multi-target detection and tracking method provided by an embodiment of the present invention.

As shown in FIG. 1, the multi-target detection and tracking method provided by the invention includes the following steps:

S101: Point cloud data is scanned by lidar, and the collected data is transmitted to the server and uploaded to cloud storage;

S102: After obtaining radar data, the footstep points are extracted by dynamic point extraction, point clustering and random forest, respectively. Footsteps are tracked by using trajectory matching;

S103: After processing the data and obtaining gait information, the results are released to users in the form of visualization. At the same time, when human is detected, relevant walking information will be output and saved to files, including walking speed, length of footsteps and other information;

The multi-target detection and tracking method provided by the invention can also be implemented by ordinary technical personnel in the industry by other steps. The multi-target detection and tracking method provided by the invention in FIG. 1 is only a concrete embodiment.

Figure 2:
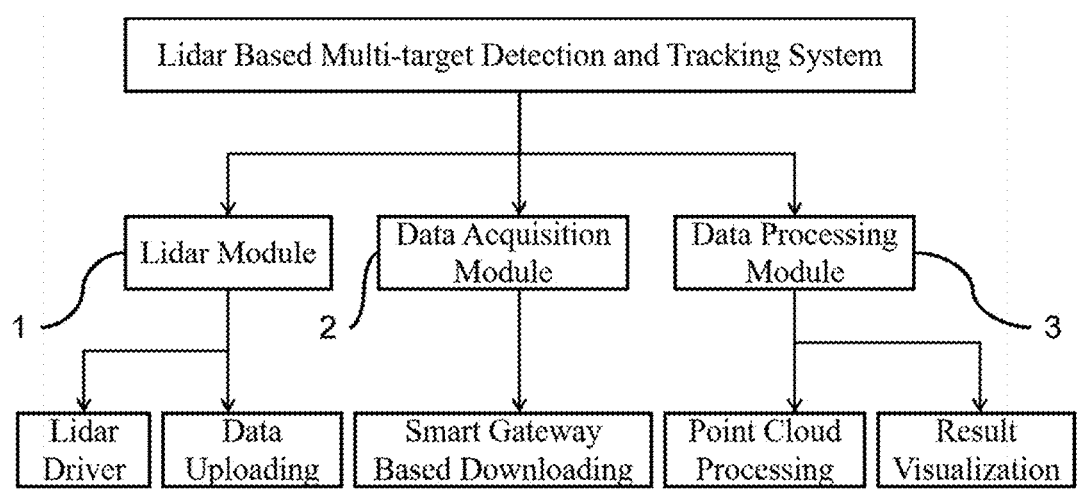
FIG. 2 is a structural diagram of a multi-target detection and tracking system provided by an embodiment of the present invention.

As shown in FIG. 2, the multi-target detection and tracking system provided by the invention includes:

The lidar module 1 contains the operation of the lidar, mainly the lidar drive and the upload of the obtained data.

Data acquisition module 2 is used to obtain the range point cloud data, which is downloaded and obtained by the intelligent gateway download platform.

Data processing module 3 is the core of the system, which mainly deals with and analyzes point cloud data, and shows the processing results.

The technical scheme of the invention is further described below in combination with the attached drawings.

1. Design of Multi-Target Detection and Tracking System 1.1 Requirement Analysis of System The invention is designed to build a system that can identify and track the footsteps of the elderly indoors. Users can obtain the collected lidar scanning data through the system, and monitor the indoor footsteps of the elderly, by running the analysis program, and get the gait parameters of the elderly.

1.1.1 Overall Business Process

Figure 3:
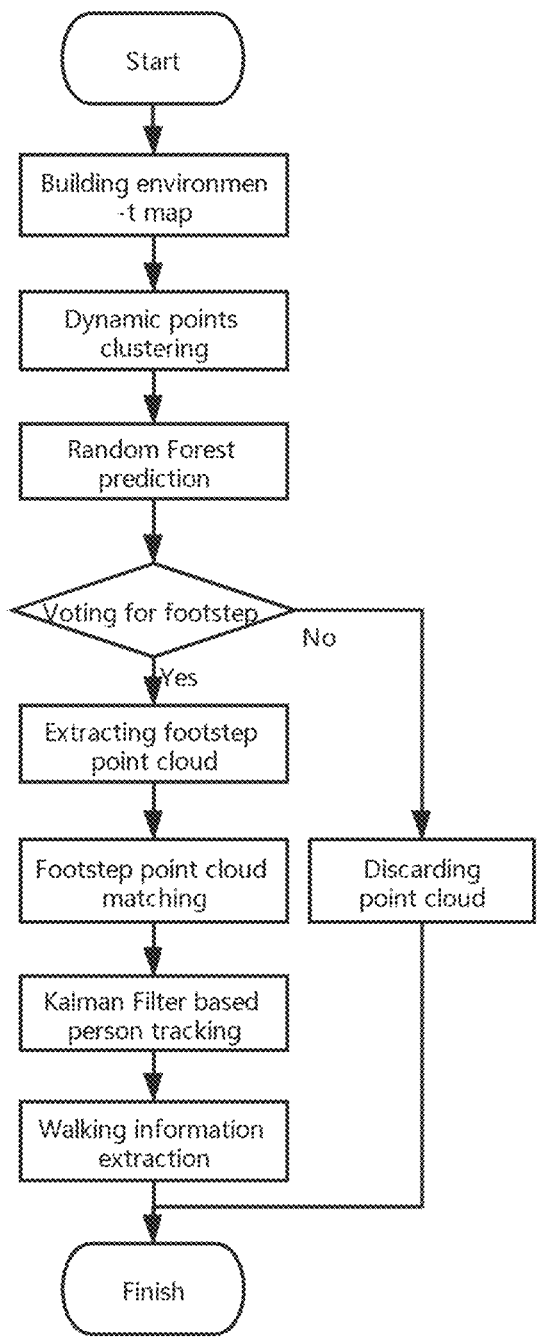
FIG. 3 is a flowchart of a multi-target detection and tracking method provided by embodiments of an embodiment of the present invention.

As shown in FIG. 3, the business process of the whole system includes data acquisition, data upload, data download, data analysis and result display. These processes represent the main working steps of the whole system. Lidar is the source of data, which needs to be arranged in the experimental scene and run stably. Then the point cloud data scanned by lidar is uploaded to the cloud storage server. When the point data is required for further analysis, the data is downloaded from the intelligent gateway, while the target tracking analysis program runs on local server for data processing and analysis. Finally, the processing results, including gait parameters, are published and displayed in the form of visualization.

1.1.2 Functional Requirements Analysis (1) Laser radar data acquisition. The system is based on the range data obtained by the laser radar sensor. The primary task is to make data sources stable. The input of the system is the point cloud data obtained by laser radar scanning. The lidar needs to be set at an appropriate position in the scene, to make the data collected more reliable. The next step is to start the lidar and connect it to a data server (Raspberry Pi computer), which transmits the collected data to the edge server and uploads it to the cloud storage. For the convenience of use, the system is designed to save the data scanned by the lidar into files, and upload the data to the cloud. Users can download the data files to the local server for further analysis.

(2) Lidar data processing. The system takes the lidar data files as the input of the tracking program, which carries out a series of processing and finally get the footstep trajectories of human. At the same time, the gait parameters of each trajectory are calculated. The point cloud data scanned by lidar needs to be converted into coordinate position data, and then all dynamic points are extracted for further footstep identification and tracking effectively. The extracted dynamic points are fed to an adopt clustering method. The independently distributed points gather into several clusters by following certain cluster rules. The centers of the clusters are taken as the target point for further tracking.

(3) Users get feedback on the results. After the data is processed and the footstep information of target is obtained, the processing results are released to the users in the form of visualization. Users can observe the target conditions indoor measured by laser radar in real time through the visualization program, as well as the gait parameters (footstep position and step length). At the same time, when the indoor target is detected, the relevant walking information will be output and saved into files, including walking speed, foot length and other information, for further analysis.

1.1.3 Nonfunctional Requirements Analysis (1) Operating Environment

This system has a 2D lidar to collect data. The invention adopts delta-1A series lidar produced by Shenzhen 3irobotix Co., LTD. This is a new generation two-dimensional lidar of low cost and low power dissipation, which has a high-speed sampling capability of up to 4000 times per second and achieves stable and reliable operation for a long time. Delta-1 series lidar can scan 360° within a 8 m radius of 2D plane, and generate plane point cloud map of the space, which can be used in mapping, robot positioning and navigation, object environment modeling and other applications. The laser emitted by the lidar meets the FDA Class T eye safety rating, ensuring the safety of humans and pets.

A Raspberry Pi microcomputer is used to connect the lidar and drive it, which is based on a ROS system. The Raspberry Pi is a micro computer has a size of a credit card, which is based on ARM micro computer motherboard, SD/MicroSD card as memory hard disk, and has all the basic functions of a PC, with Linux operating system. The indoor tracking system is environmental friendly and convenient, by employing the Raspberry Pi to drive the lidar. The Raspberry Pi reboots at 4 o'clock am, to guarantee the continuous scanning work. The invention adopts Raspberry Pi 3B+ model and runs Ubuntu MATE 16.04 LTS operating system.

Data upload is based on the ROS bridge service provided by ROS platform. The program for receiving and uploading point cloud data is developed in Java language based on SpringBoot. A server runs the receiving and uploading program is set to be under a same smart gateway as the driver Raspberry Pi. The ROS bridge service can quickly and stably connect ROS nodes and non-ROS systems for data transfer. The Raspberry Pi runs ROS platform is considered as a host, with Ubuntu 18.04 operating system and ROS Melodic platform, which is employed to run the target identification and tracking program. On the host, the C++ source files are compiled and processed first. After the compilation, the launch file is executed, while the whole project node is run through the startup configuration of the program, including C++ programs and Python programs.

A cloud storage server stores point cloud data transferred from edge Raspberry Pi. These point cloud data is used as the data source for target tracking programs. The invention adopts a ECS cloud running CentOS operating system with MinIO storage service as the cloud storage server. The cloud storage server is an object storage service based on the Apache License V2.0 open source protocol, which is compatible with Amazon S3 cloud storage service interface. The strong compatibility makes the storage server ideal for storing large amounts of unstructured data, such as images, videos, log files, backup data, and container/VM images. An unstructured data object file can be any size, from a few kilobytes to a maximum of 5 terabytes. And MinIO is a very lightweight service, that can be easily combined with other applications such as NodeJS, Redis or MySQL.

(2) Performance Requirement

The invention can ensure that lidar and Raspberry Pi computers work continuously for 24 hours after reboot, as well as the surrounding scanning and synchronize data uploading. The data files obtained by continuous working for one hour are approximately less than 200 MB, and 24 hours continuous work requires approximately 4.6 GB of storage space. At the host end, the target tracking program can be run at any time to analyze the downloaded data and get the results.

(3) Portability Requirements

The lidar module of the invention shall be mounted in the indoor environment to be monitored and driven by a Raspberry Pi computer, which can be replaced by any Linux computer that runs the ROS platform. The invention employs Linux server to upload and download the point cloud data. And the download platform is in the form of web pages, which can be opened and used in a variety of browsers. The target tracking program is currently running in native testing and can be ported to a Linux operating system server, which supports ROS installation to compile and run to view the results.

(4) Reliability Requirements

Data continuity and reliability come first. When unpredictable errors or stops in data uploading are found, the lidar driver Raspberry Pi reboots automatically to maintain a good network environment.

1.2 System function module, mainly introduces the general design of each function module of the system. As shown in FIG. 2, the overall module of the lidar based multi-target tracking system is as follows: 1. laser radar mode, 2. data acquisition module, 3. data processing module. The Lidar module contains the operation of the lidar, mainly the lidar drive and the upload of the acquired data. Data acquisition module is used to obtain the lidar point cloud data, which is downloaded and obtained by the intelligent gateway download platform. Data processing module is the core of the system, mainly processing and analyzing point cloud data and displaying the processing results.

1.3 System core business target tracking process, the core of the system for target tracking. The flow chart of the target tracking program is shown in FIG. 3, which describes the operation process of the core functions of the system. The main process includes the establishment of environmental map, clustering of dynamic points, random forest prediction, release of human footstep points, footstep pairing, Kalman filter tracking and acquisition of gait parameters.

Figure 4:
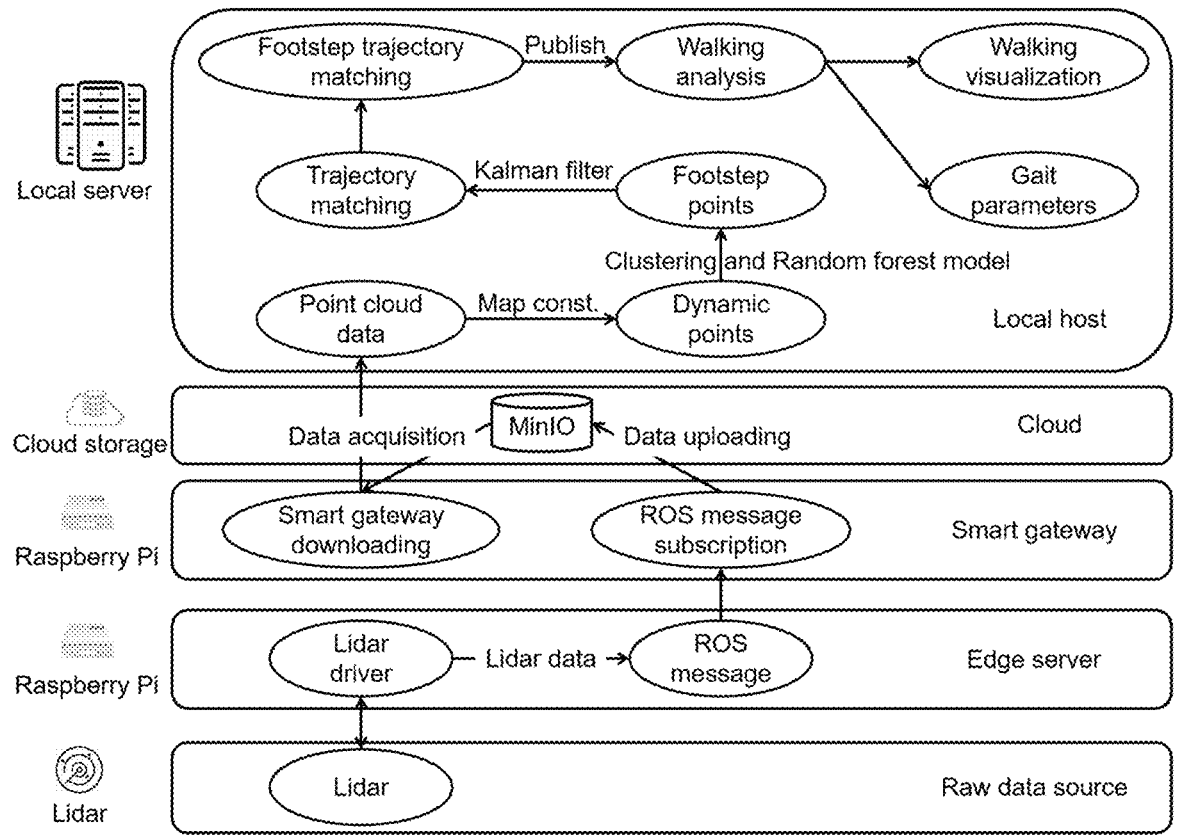
FIG. 4 is an architectural diagram of a multi-target detection and tracking system provided by an embodiment of the present invention.

1.4 System architecture: The system architecture diagram is shown in FIG. 4. The Lidar serves as the original data source, powered and driven by a Raspberry Pi computer. The Rosbridge service runs opened on the Raspberry Pi edge server, where the port is set and the client program of the server is used to connect ROS node of the Raspberry Pi and obtain the content of scan message. The obtained data is uploaded to the MinIO cloud storage service. When the user uses the ROS platform of the host to wake the target tracking program, the user can download the data from the intelligent gateway on the server, select the corresponding scan type data, select the required data period, and then download the data. Then, the program of the host terminal conducts a series of processing on the point cloud data scanned by lidar, and finally get the visual display of human tracking and gait parameters of the target.

The present invention mainly describes system requirement analysis and outline design. The main requirement of this system is to complete a system based on laser radar equipment, that can identify and track the footsteps of the elderly indoors. Users can obtain the collected lidar scanning data through the system, and monitor the indoor footsteps of the elderly by running the analysis program, and get the gait parameters of the elderly. The invention introduces the business process, functional and non-functional requirement analysis of the invention, and shows the functional modules and system architecture of the system in the form of diagrams.

Through the invention, the requirements of the invention, functions to be completed, objectives to be achieved and the design framework of the whole system have been relatively clear.

2. Detailed Design of Multi-Target Detection and Tracking System 2.1 The design of laser radar module, introduces a series of operations of the invention using laser radar to collect the required data, including lidar setup, lidar startup, data upload and so on.

2.1.1 Lidar Placement Setup

When the lidar is working, the lidar ranging core rotates clockwise, so as to realize the 360° omni-directional scanning of the surrounding environment, so as to obtain the plane point cloud map information of the space. Ideally, the lidar should be placed on the open ground, where it has the best coverage, the widest field of view, and the least interference. However, in the free living situation, there is a lot of feasibility to be considered. In order to obtain reliable data, minimize the impact on indoor pedestrians, the invention chooses to place the lidar at the bottom of the scene, such as sofa, desk and chair, which is close to the power supply by the wall and has a large space at the bottom. The invention sets the experimental environment as an indoor environment similar to home, and carries out experiments in both the experimental environment and the free living environment.

2.1.2 Lidar Driving

The lidar is connected to the driver Raspberry Pi through a USB port. The raspberry PI computer port is opened by using relevant commands, as well as the lidar drive provided by the ROS platform.

2.1.3 Lidar Scanning Data Uploading

The receiving and uploading of laser radar data in the invention is implemented by the Rosbridge server. Rosbridge is a functional package that can be used for communication between non-ROS systems and ROS systems. Non-ros systems invoke ROS functions by using JSON-formatted network requests with specified data content (Rosbridge supports TCP, UDP, WebSocket). The Rosbridg server runs on a Raspberry Pi computer with specified port. At the same time, the client program runs on another Raspberry Pi computer, which is connected to the corresponding ROS port, receives the corresponding topic, and then gets the message data in the message topic being published in JSON format. Finally, the data is saved into files and uploaded to the cloud storage system.

2.1.4 Lidar Data Downloading

The laser radar data of the invention is stored in the cloud, which can be packaged and downloaded from the smart Gateway Raspberry Pi computer. The smart gateway runs a web page program based on SpringBoot framework, which helps the user to start the gateway, open the web page, choose the data type, choose date and time, and download the corresponding data.

2.2 Point Cloud Data Processing Design

This section mainly introduces the process design of how to conduct preliminary processing after obtaining the point cloud data, and finally identify and track the footsteps of targets.

2.2.1 Analysis of Lidar Data

The lidar data type is Sensor_MSGS/LaserScan, provided by ROS platform, as shown in Table 1 and Table 2. For the lidar used in this invention, 360 points are obtained in each scanning frame, where these points are the obstacles encountered by the laser emitted by the lidar. The angle difference of adjacent points, Angle Increment, is approximately 1°. The invention focuses on the location information of ranges array, which is a float array to represent the location information of these points. The value stored in the ranges array is the distance corresponding to each point from the coordinate center (the lidar) in meters; The order in the array corresponds to the increasing of the scanning angle in turn, indicating the angle information of the corresponding point. Thus, the position information of the scanning point can be determined, that is, the polar coordinates of the scanning points can be obtained. In addition, the frequency of lidar represents how many scanning frame data can be obtained in a certain period of time. In the present invention, the frequency of lidar is about 6 Hz, that is, 6 scanning frame data can be obtained in 1 s.

$$\begin{cases} x = \rho \cdot \cos\theta \\ y = \rho \cdot \sin\theta \end{cases} \quad 3\text{-}1$$

According to the transformation between polar coordinates and rectangular coordinates, the formula (3-1) is used directly transfer the lidar data from polar coordinates to rectangular coordinates, in the form of X-Y coordinates in rectangular coordinate system. Then, the horizontal and vertical coordinates of the obstacle positions scanned in this cycle, are published to the corresponding ROS nodes for subsequent analysis programs.

TABLE 1

Gait parameter table

| Parameter | Data type | Description |
|---|---|---|
| header | Header | The data format, commonly used in ROS with time stamps in cross-platform communications, is standard metadata, which is described in detail in Table 2. |
| angle_min | float32 | The initial angle of the scan, in rad. |
| angle_max | float32 | The final angle of the scan in rad. |
| angle_increment | float32 | The angle difference between adjacent measurements, in rad. |
| time_increment | float32 | The interval between adjacent measurements, in second. |
| scan_time | float32 | The interval between adjacent scans, in second. |
| range_min | float32 | The minimum value of the scanned distance, in meter. |
| range_max | float32 | The maximum value of the scanned distance, in meter. |
| ranges | float32[ ] | The distance array of scanned environment points, in meter. |
| intensities | float32[ ] | Density information, relative to the lidar equipment. |

TABLE 2

Header table

| Data | Data type | Description |
|---|---|---|
| seq | uint32 | An ID queue that keeps growing. |
| stamp | time | A timestimp, containing two Integer types of data, sec and nsec, representing seconds and nanoseconds. |
| frame_id | string | Frame ID, "Laser" in this invention. |

2.2.2 Dynamic Point Extraction

Firstly, the original point cloud data is preliminatively processed by the invention to screen out most points that keep moving. The preliminary screening of point cloud data can basically extract the dynamic points, which have a positive impact on the following analysis and exclude the influence of environmental points on tracking targets. Thus, the difficulty of the following tracking process is greatly reduced, while the tracking accuracy maintains high level. There are two schemes that can be considered at first to extract the dynamic points. One is to compare the scanned data of each frame, to judge whether the positions of points have changed dramatically. Second, the fixed environmental points are excluded while the non-environmental points are retained. After comprehensive consideration, including the difficulty of implementation and the effect of extracting dynamic points, the invention decides to adopt the method of setting up an environment map and combine multi-frame comparison as a guarantee.

The specific implementation method is as follows: comparing the point cloud data frame by frame, calculating the distance difference of the corresponding angle between two adjacent frames, calculating the sum of the distance differences of 360 corresponding points, and taking the data of a period of time to calculate the mean of the sum of the distance difference, called mean difference. The mean difference is threshed to identify dynamic points. When the mean difference within a period of time is smaller than a given threshold, the cloud points are static. And an environment map is created by using the static points. The drawing of environment map can be carried out at the same time of data reading. When a certain amount of data is read, frame difference method is used to estimate the static points. Within the target tracking process, if the cloud point is estimated to be static, a new round of environment map replacement can be carried out.

2.2.3 Point Clustering.

Scattered and disorderly points reduce the footstep identification and tracking accuracy dramatically. Thus, clustering these useless points is a necessary process for the subsequent walking analysis. Density clustering is selected for scattered and disorderly points clustering, which can find clusters of various shapes and sizes in noisy data. Free living situation is full of noisy, which makes the density-based clustering method more suitable for the application scenario, the gait analysis of older adults in free living. BDSCAN is a famous density clustering algorithm, whose core idea is to find points with high density, and then gradually connect the close points with high density to generate various clusters. The DBSCAN algorithm has the following advantages: there is no need to specify the number of clusters in advance, while clusters of any shape can be found; It is insensitive to outliers and can automatically identify outliers in the clustering process. The clustering result does not depend on the traversal order of nodes.

Although this algorithm is generally suitable for lidar scanning environment, DBSCAN algorithm will deteriorate the clustering quality for data sets with uneven density and large distribution differences among clusters. Due to the complexity of the environment and the inevitable jitter of lidar, noise points will appear in the scanning data. In order to avoid the influence of noise points on clustering, the invention chooses to delete the cluster with few points after clustering. The DBSCAN algorithm flow is shown in Table 3.

TABLE 3

The DBSCAN algorithm flow

Algorithm 1 The DBSCAN algorithm
Input: Scanning dataset D={$x_1, x_2, ... , x_m$}; Domain parameters (e, Minpts).
Output: Cluster set C=(C1,C2,...,Ck}
1:  Initialize the core target set: $\Omega = \{\emptyset\}$
2:  for j = 1, 2, ..., m do
3:      Find the e-neighborhood $N_e(x_j)$ of sample $x_j$;
4:      if $|N_e(x_j)| \geq$ Minputs then
5:          Add sample $x_j$ to the core target set: $\Omega = \Omega \cup \{x_j\}$
6:      end if
7:  end for
8:  Initialize the cluster number: k = 0
9:  Initialize the dataset not accessed: $\Gamma = D$
10: while $\Omega \neq \emptyset$ do
11:     Record the dataset not accessed: $\Gamma_{old} = \Gamma$;
12:     Pick a core target randomly o ∈ $\Omega$; Initializing the queue Q = < o>;
13:     $\Gamma = \Gamma \setminus \{o\}$;
14:     while Q ≠ ∅ do
15:         The the first sample q in the queue Q;
16:         if $| N_e (q) | \geq$ Minpts then
17:             $\Delta = N_e (q) \cap \Gamma$;
18: Queue the samples in $\Delta$ to Q;
19: $\Gamma = \Gamma \setminus \Delta$;
20:         end if
21:     end while
22      k = k + 1, Generate clusters $C_k = \Gamma_{old} \setminus \Gamma$;
23:     $\Omega = \Omega \setminus C_k$
24: end while In the invention, each frame is processed through the coordinate transformation, the dynamic points extraction, the DBSCAN clustering, and small clusters deletion. Finally, footstep candidates are obtained for each scan frame.

2.2.4 Point Cluster Feature Extraction

After obtaining the footstep candidates, the invention extracts the features of these sets. Since it is difficult to identify footsteps from footstep candidates, the feature extraction is valuable in help the footstep identification, which is also the object of the invention. More footstep information can be obtained by extracting several point cloud features, and the invention can identify and classify the point clouds. Here, combining experimental experience with goal-driven method, several point cloud features are designed as following.

(1) Cluster center. The center point of each cluster is the representative point of all points in the point cluster, which is used to represent the position of the footstep candidate. The invention takes the average of point coordinates in the cluster as the cluster center feature.

(2) Distance range. The invention considers that the footstep points should distribute within a distance range, which is the distance range feature.

$$F_d = |p - p_c| < 0.14 \text{ m} \quad (3\text{-}2)$$

where |•| is the $L_2$ norm, p=(x, y) is represents a point in the point cluster, x and y are the coordinate, $p_c$ is the cluster center; The cluster distance range threshold is set to 0.14 m (3) Footstep length. Roughly, the step length should be equal to the distance between the two points with the largest distance in the cluster.

$$F_l = \max_{\forall f,b} |p_f - p_b| \quad (3\text{-}3)$$

where $p_f$ and $p_b$ are two arbitrary points in two clusters of two adjacent frame.

Figure 5:
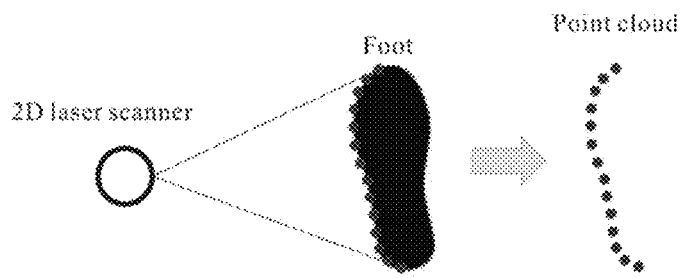
FIG. 5 is a schematic diagram of a step point cloud of lidar scanning provided by an embodiment of the present invention.

(4) Foot arc. The laser scanner can capture the foot silhouette in one direction. The point cluster of this foot silhouette is assumed to have arc shape, as shown in FIG. 5, which is defined as the mean value of adjacent radian in the cluster, as following:

$$F_c = \frac{1}{n-1} \sum_{i=2}^{n} a\cos \frac{|p_i - p_c|^2 + |p_{i-1} - p_c|^2 - |p_i - p_{i-1}|^2}{2|p_i - p_c| \cdot |p_{i-1} - p_c|} \quad (3\text{-}4)$$

where $p_i$ and $p_{i-1}$ are two adjacent points in the cluster, $p_c$ is the cluster center, n is the point number in the point cluster.

(5) Foot arc length. The total length of the foot silhouette is defined as foot arc length, as following:

$$F_a = \sum_{i=2}^{n} |p_i - p_{i-1}| \quad (3\text{-}5)$$

where $p_i$ and $p_{i-1}$ are two adjacent points in the cluster, n is the number of edge point in the cluster.

2.2.5 random forest model. After the dynamic point extraction, the invention still cannot identify footsteps from background points. In order to make the recognition of human feet more accurate, it is necessary to recognize each cluster point set and make footsteps as the tracking targets of as far as possible. Therefore, the invention chooses the machine learning algorithm of random forest to classify and identify the point clusters, so as to screen out the footsteps more quickly and efficiently. This is the specific use of the proposed feature, which can be used as the basis for judgment through the features of point cluster. The invention uses the trained random forest model to recognize the point clusters, classify the clusters into foot class and non-foot class. The classification results are published to corresponding nodes for subsequent processing.

2.3 Footstep tracking, mainly introduces how to process the footstep tracking after the initial processing of the original point cloud data, and the formation of footstep and non-footstep message data.

Figure 6:
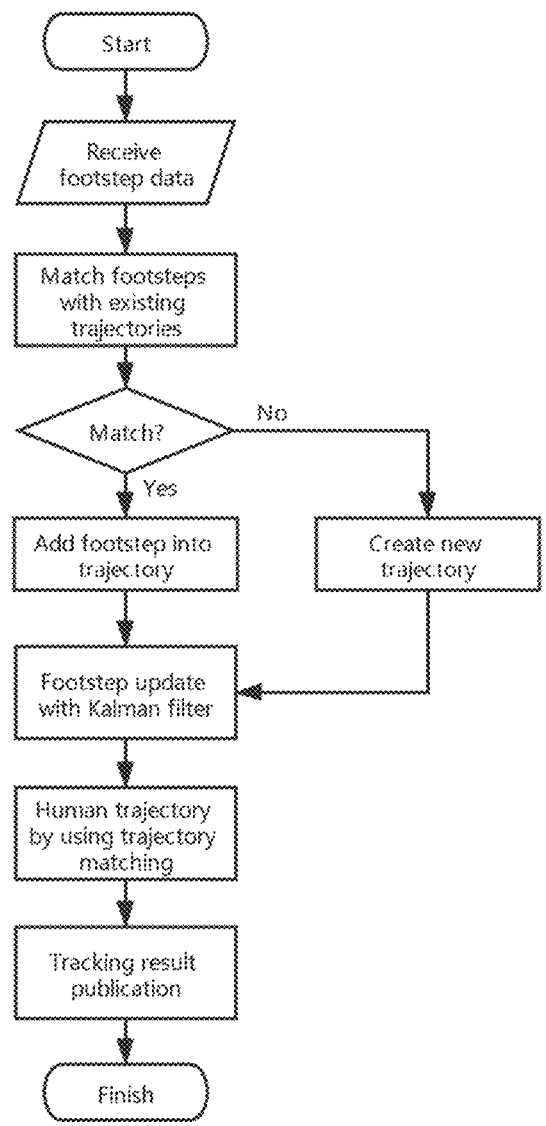
FIG. 6 is a Flowchart of the human tracking process provided in an embodiment of the present invention.

2.3.1 The overall flow of footstep tracking, is shown in FIG. 6. The tracking program maintains a tracking trajectory for each tracking target. Whenever the footstep message is published by using the proposed procedure, the position information of the footstep point is recorded. Then, the existing trajectory is matched with these footstep points, by calculating the Mahalanobis distance between footstep and trajectory, to form an overhead matrix. The overhead matrix measures the congruency between the footstep points and the trajectories, the smaller the value is, the more likely it is to be matched.

With the congruency estimation, a distribution problem follows, which is an optimization problem. Footsteps are assigned to the trajectories to minimize the total overhead. If there are footsteps left without trajectory assignment, newly opened trajectories are reassigned to these footstep points. After the trajectory assignment, the position of footsteps in the trajectory is updated. Then, the target state observed by lidar is fed into the Kalman filter to complete the state update. Then trajectories with low credibility are deleted. After obtaining reliable footstep trajectories, trajectory matching is carried out to form human trajectory. Here, several conditions are set to constraint the trajectory matching process. Finally, the human tracking and footstep trajectory information is released, and the gait parameters are output to form visual results.

Footstep trajectory matching is measured by Mahalanobis distance. Mahalanobis Distance is a measure of distance, which can be regarded as a modification of Euclidean Distance. It corrects the inconsistent and related problems of various dimension scales in Euclidean Distance. The mahalanovic distance between points X and Y of two random variables, which follow the same distribution with covariance matrix E as shown in Formula 3-5.

$$D_M(x,y)=\sqrt{(x-y)^T\Sigma^{-1}(x-y)} \quad (3-5)$$

The Mahalanobis distance has many advantages: the mahalanobis distance is not affected by the dimension, which makes distance between two points independent from the measurement unit of the original data; The Mahalanobis distance between the two points calculated from standardized data and centralized data (i.e. the difference between the original data and the mean) is the same. Mahalanobis distance can also eliminate the interference of correlation between variables. Therefore, it is appropriate to calculate the correlation of footsteps and trajectories in the present invention. After calculating the distance between footsteps and trajectories, the allocation method is employed to minimize the total cost with the overhead matrix.

2.3.2 Kalman Filter Based State Update

Kalman filter is a linear system state equation, which estimates the optimal state of the whole system, through input and output observation. The optimal estimation can also be regarded as a filtering process, since the observation includes the influence of noise and disturbance in the system. The basic principle of the Kalman filter is that any prediction established by the model or measured by sensors has certain error, in which the model error can be approximated as Gaussian white noise, and the measurement error is represented by the variance matrix. Kalman filter model is a recursive estimation, which can estimate the current state with the last state and the observation of current state.

Because the observed value obtained by the lidar has high accuracy and high scanning frequency, the lidar data meets the requirement of kalman filter based tracking. The invention, the Kalman filter based human tracking, is feasible in both theory and practice. The simplicity of the Kalman filter model satisfies the real time request. The invention employs Kalman filter algorithm to build a dynamic system, model the footsteps, and track the walking trajectory.

The state prediction equations of Kalman filter algorithm are shown in formulas (3-6):

$$X_k = A_k X_{k-1} + B_k u_k + w_k \quad (3-6)$$
$$z_k = H_k X_k + v_k$$

where X presents the footstep status in the tracking trajectory, $X_k=[x_k, y_k, x_k', y_k']$ is the centroid state vector of one tracking trajectory in frame k, the Kalman model updates the tracking status every scan frame, k and k−1 present two adjacent frame: A is the state transfer matrix; B the input control matrix, which maps the walking information into the state vector; u is the system control vector, including acceleration information of foot; w is process noise; H is the transition matrix, which maps the state vector to the measurement space (mahalanobis space); v is the observation noise.

Each frame has a Kalman state, the invention can estimate the next state through the dynamic system model. The current states scanned by the lidar and the next states estimated by the Kalman filter model are affected by noise, which can be imported into the Kalman filter model for equilibrium optimization. By estimating the next state, the Kalman filter model can effectively avoid the temporary loss in the tracking process, such as footsteps being blocked by environmental objects. When the clocking happens, the trajectory output by the Kalman filter model will be retained, until matched footsteps appear again. Otherwise, the trajectory will be removed, without new matched footsteps appearance. The Kalman filter based state update algorithm is shown in Table 4.

TABLE 4

The Kalman filter-based state update algorithm
Algorithm 2 The Kalman filter-based state update algorithm Input: $c_k$, candidate, n
Output: walkset
1: top:
2:     $c_k \leftarrow Kalman(c_k)$
3:     update( )
4:     if$c_k$ in candidate(k) then
5:        walkset∪ {ck}
6:        gototop.
7: else
8:     fori = 1 →ndo
9:        if$c_k$ in candidate(k + 1) then
10:         walkset∪ {$c_k$}
11:         gototop.
12:        else
13:         update( )
14:        end if
15:        returnwalkset
16:     end for
17: end if The invention is mainly divided into laser radar module, preliminary processing module of point cloud data, and footstep tracking module. After the processing of these modules, the system finally gets the result of human tracking, which is displayed by visualization. In the present invention, the data processing process of laser radar is introduced in details. After obtaining the lidar data, the footstep points are extracted by dynamic point extraction, point clustering and random forest model, respectively. Finally, the footsteps are tracked by track matching algorithm.

3 System Implementation 3.1 Implementation of Lidar Module

In the previous system design, the module design process has been introduced. Here, the process procedure of the invention will be described from the perspective of system implementation. Firstly, the edge server, a Raspberry Pi 3B+, loads Ubuntu MATE 16.04 LTS, which is installed by using SD card system burning. ROS platform with Melodic version is installed on the edge server. The lidar driver is compiled in the ROS project by using catkin_make. After the installation, the lidar is connected to the edge server, a Raspberry Pi 3B+. The edge server runs the lidar driver with corresponding port, publishes the scanning data to the ROS node named "/scan".

The message is then transmitted using the Rosbridge protocol, which is supported by the Rosbridge service. The Rosbridge service runs with a Websocket and a specify port. A Rosbridge client program runs on a smart gateway, a Raspberry Pi computer, to gather the scanning data from the edge servers. The connections between the smart gateway and the edge servers are constructed by using Rosbridge protocol, with IP addresses and corresponding ports. The smart gateway subscribes the "/scan" node released on the edge server. Then, the lidar data in JSON format is transferred to the MinIO cloud storage, by using the API provided by MinIO service. The lidar data can be downloaded with selected node name, date, and time, from the SpringBoot based gateway management platform.

3.2 Implementation of Point Cloud Processing

The implementation of point cloud processing mainly introduces the concrete method of preliminary processing of point cloud data, which includes the extraction of dynamic points, the clustering of point clouds and the footstep point extraction.

3.2.1 Implementation of Dynamic Point Extraction

The method of dynamic point extraction is to build environment map. Roughly static range data is considered as environment map, which is the average of a certain amount of frames. Two arrays with the same size are used to build environment map. The lidar data is represented by point cloud in polar coordinates, distance and angle for each point. In the form of polar coordinates, the invention scans the surroundings through lidar. One float array with the length of 360 (360 angles for each frame) is created to record the environment map, called map array. Each item in the array represents a corresponding obstacle distance. The map array records the average value of frames in a period. Another float array with the length of 360 is created to record the differences between the map array and the upcoming frame, which are calculated for distance difference of each corresponding angle. A linear threshold method is adopted to detect static environment, with dynamic threshold, by considering the interference error caused by the lidar jitter. The farther away from the lidar is, the greater the error caused by the jitter will be. Therefore, a function is set to change the error into a similar linear value, as well as the threshold. If the value is less than the corresponding threshold, the point is an environment point (static), which needs to be deleted in the dynamic point extraction procedure, and the distance value of this angle is set to 0. Otherwise, the point is a dynamic point. The information of the dynamic points is encapsulated into a ROS message (Sensor_MSGS::LaserScan), and published in the same way of the scanning data. The dynamic point extraction process is also combined with another strategy, frame difference. For the adjacent map arrays in a time period, the distance difference of each angle can be used as threshold coefficient to detect static environment. The threshold can be set to $d_s/1.5*T_{threshold}$, where $d_s$ is the distance difference in angle, $d_s/1.5$ is the threshold coefficient. If the map array difference is less than this updated threshold, the environment is considered to be static, and the map array can be used as environment map data.

The invention keeps detecting static environment and updating the map array, by using the proposed frame difference method, except in the target detecting and footstep tracking process. With the upcoming frames, a two-dimensional array is used to save a certain amount of frame data, which is used to detect static environment. If the frame differences in a time period are smaller than the dynamic thresholds, the environment is considered to be static in this period, and the map array is updated then. Otherwise, the target detecting procedure is carried out to detect human feet. In this way, the environment data can be updated in real time, to prevent the detection environment from changing greatly.

Figure 7:
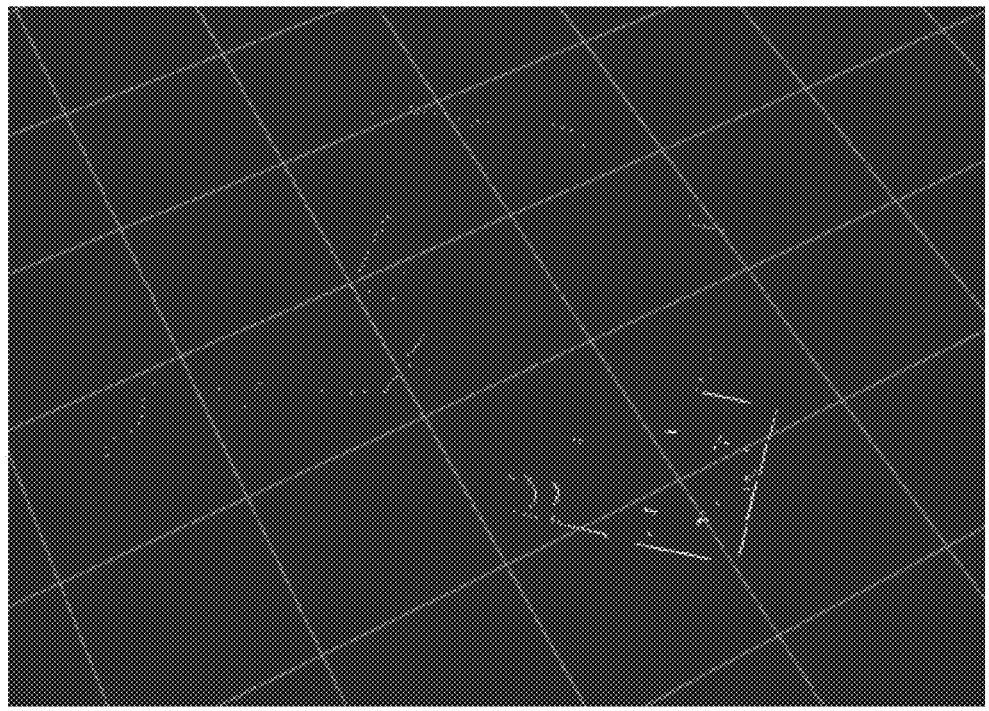
FIG. 7 is a schematic diagram of the original data provided by an embodiment of the present invention.
Figure 8:
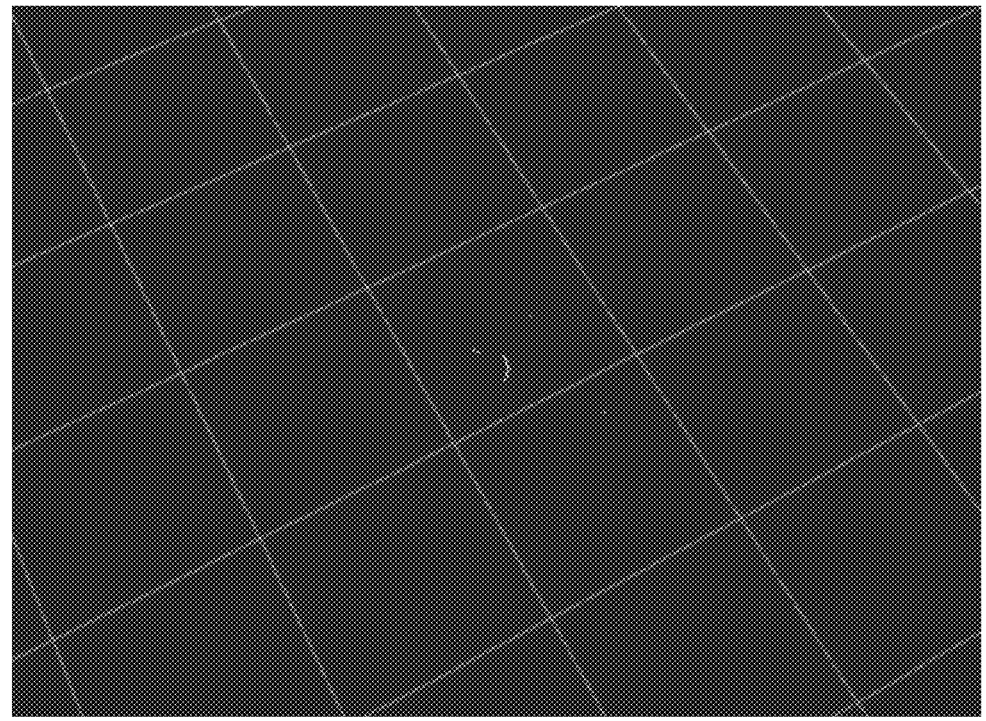
FIG. 8 is a schematic diagram of dynamic point extraction provided in an embodiment of the present invention.

The result of dynamic point extraction is shown in FIG. 7 (environment map), and the map array updating result is shown in FIG. 8. It can be observed that the complex environment points are almost eliminated, leaving only dynamic points, which are basically footstep points. There are some noise points due to the lidar jitter.

3.2.2 Implementation of Footstep Extraction

Figure 9:
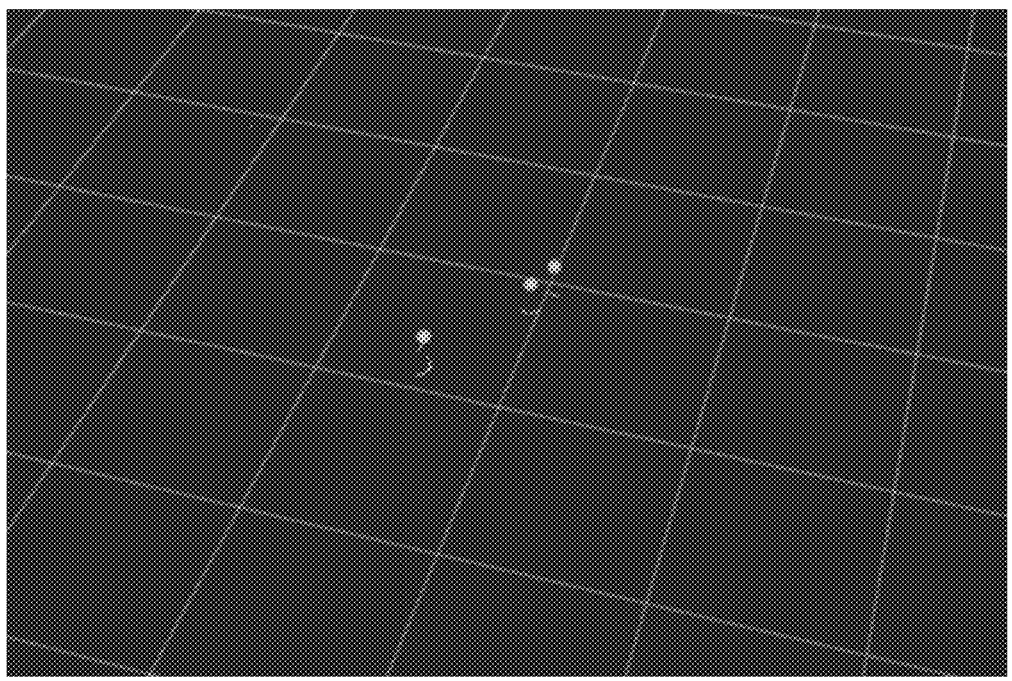
FIG. 9 is a schematic diagram of the footstep extraction effect provided by an embodiment of the present invention.

The implementation of footstep extraction mainly contains the point clustering method and the random forest based classification algorithm. The point clustering method employs the proposed BDSCAN algorithm, to obtain the point clusters, in a density clustering way. Meanwhile, several features are extracted from the obtained point clusters, which are fed into the random forest model to predict the classes of clusters. In the visualization, the center points of the clusters are shown in black balls, while the points detected as footsteps are marked blue. The visualization of footstep extraction is shown in FIG. 9.

3.3 Implementation of the Footstep Tracking Module

The footstep information is obtained from ROS nodes, "/detected_objects_clusters", by running a ROS client program in Python. Each footstep is added to a footstep list by recording the location. Length, and time of the footstep. The invention keeps updating the footstep trajectories with new arrived footsteps, by using the proposed footstep matching algorithm. The matched footstep is fed into Kalman filter to predict the location of next step, based on the current step. The Kalman filter is initialized with the conversion matrix "transition_matrix", observation state matrix "observation_matrix", transformation covariance "transition_covariance", and observation error covariance "observation_covariance". In the error setting process of Kalman filter, process errors are selected according to the lidar scanning frequency. The conversion matrix and covariance of Kalman filter are constructed according to the motion model. The implementation of the Kalman filter employs Python's pykalman library. After updating the trajectory state using the Kalman filter, the gait speed is calculated with the time difference of the two footstep locations in the trajectory. Then, footstep trajectories are matched to form human trajectories by using distance relative matching method.

Figure 10:
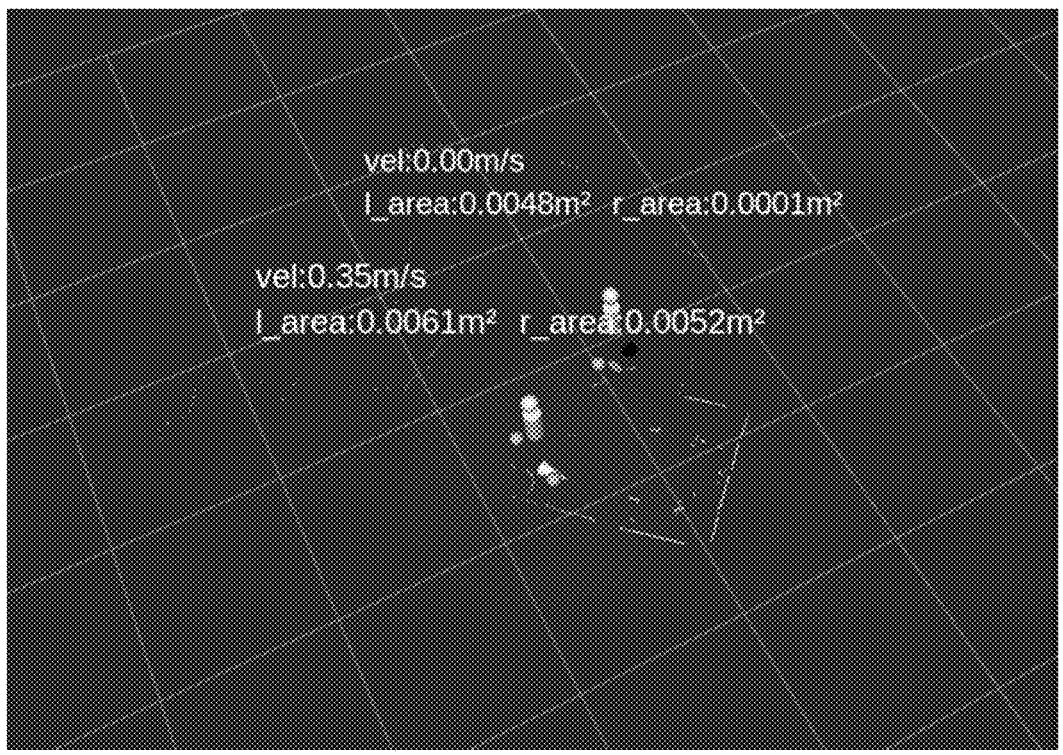
FIG. 10 is a schematic diagram of the human tracking visualization results provided by an embodiment of the present invention.
Figure 11:
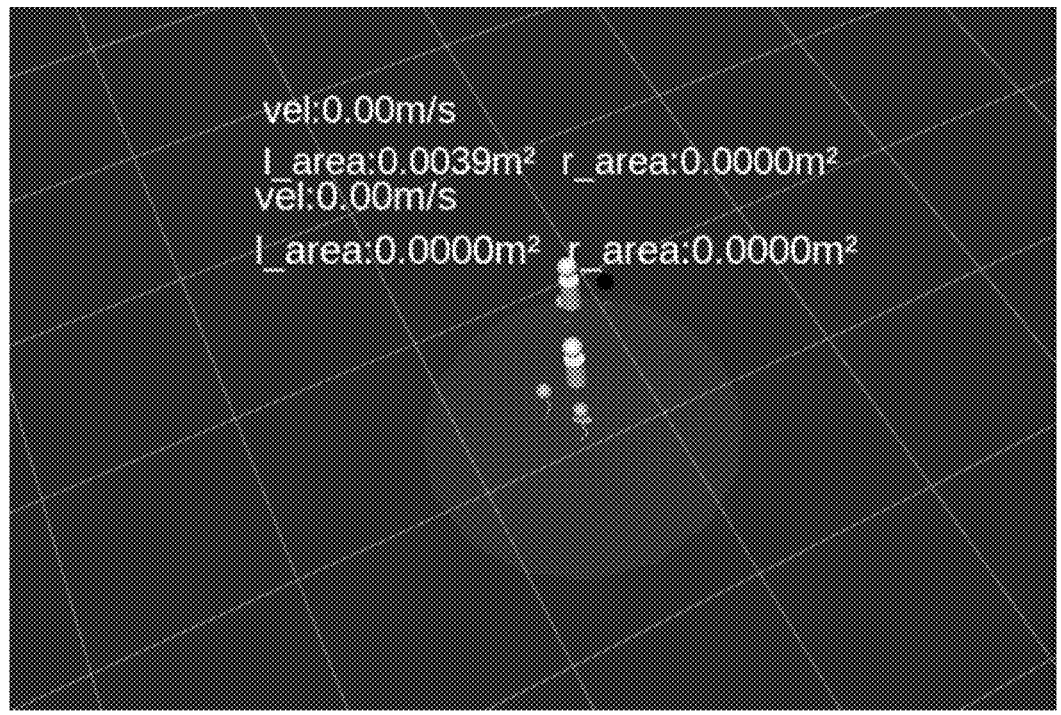
FIG. 11 is a schematic diagram of the human tracking updating provided in an embodiment of the present invention.

In this way, the footstep tracking module implements real-time human tracking. The information of human tracking and footstep tracking is packaged into ROS messages "/PersonArrary" and "/footprint_tracked", respectively. The locations of human and footsteps are published on two nodes "/people" and "/footprint". The invention automatically calls the Rviz visualization tool of ROS platform, to subscribe the two nodes and display the location of human and footsteps on the screen, through the specified data flow format "ROS:: Marker", as shown in FIG. 10. In FIG. 10, the ball and cylinder indicate the location of human, the tip of the transverse cone points the walking direction, and the length of the cone represents the walking speed. Points under the cylinder indicate the location of footsteps, and the small point around the cylinder are scanning points. FIG. 11 shows the tracking results by removing the environment point away. Gait parameters published are shown in Table 5.

TABLE 5

Gait parameters

| Parameter | Data type | Description |
|---|---|---|
| Human position | (x, y) | The coordinate position of target, in meter |
| Left foot speed | float | The speed of left foot, in m/s |
| Right foot speed | float | The speed of right foot, in mls |
| Left foot length | float | The length of left foot, in meter |
| Right foot length | float | The length of right foot, in meter |
| Area of left foot | float | The area of the left foot is estimated by foot length, in m$^2$ |
| Area of right foot | float | The area of the right foot is estimated by foot length, in m2 |
| Left step length | float | The distance of a left footstep, in meter |
| Right step length | float | The distance of a right footstep, in meter |

3.4 Difficulties of Footstep Tracking Module

Since the simulation test of the invention is estimated in free living situation, there are many difficulties in processing the range data, due to the complex free living environment.

Firstly, the indoor environment is complex with many obstacles scattered in various parts of the rooms, while human activities in free living situation are multifarious, not just walking. Addressing the proposed challenges, clusters with few points are removed after the point clustering process, to avoid the interference of scattered points. In the target tracking procedure, a tracking trajectory will be maintained for a long time, even when the footstep points disappear caused by occlusion or part self-occlusion. The prediction states will be used to complete the tracking.

Secondly, severe occlusion happens in the tracking procedure. Since the lidars are mounted at the edge of room for safety, their perspectives are not as wide as placed in the middle of room. As a result, the perspectives are severely affected by various surroundings.

In many scenes, the invention finds that some footstep points are very short or sparse, which greatly increases the identification error of the random forest model on human feet. These cluster sets basically lost the characteristics that should be possessed by human foot, such as the length of foot, etc. Even worse, the scanned footstep points are sparse caused by occlusion, which will be ignored in the clustering process. Considering this issue, in the trajectory matching process, one footstep trajectory can output a human tracking trajectory, when another footstep trajectory disappears.

Considering not move for a long time period situation, the invention carries out continuous tracking after scanning and recognizing the footsteps. If the footsteps stop moving, the tracking states predicted by the Kalman filter remains. Meanwhile, the footstep trajectory matching process does not require a certain step length between two trajectories.

The invention describes the implementation of lidar based target recognition and tracking method in detail, from the perspective of system and program realization. The invention first introduces how to build the system platform of the lidar module step by step, and then introduces how to deal with the point cloud data, footstep identification, and footstep tracking in the program. Finally, a series of difficulties and challenges found in the experiment are introduced, as well as the corresponding solutions.

The technical effects of the invention are described in detail as following, in combining with system testing and verification.

1. Overall System Test

This subsection mainly describes the testing of the entire system, to verify whether the deployment of the system can achieve the expected results. The system test results are shown in

TABLE 6

System test table

| Operation | Expectation | Result |
|---|---|---|
| Activate lidar | Point cloud data can be observed on the ROS platform. | Pass |
| Start the Rosbridge client program | Point cloud data can be observed on the web management page of the cloud storage. | Pass |
| Download data files from the intelligent gateway | Data files are saved to the local server. | Pass |
| Extract dynamic points by using map array | The scan points published in the visualization exclude the environment points. | Pass |
| Cluster dynamic points | Dynamic points are reasonably classified into several classes with different colors. | Pass |
| random forest prediction with clusters | Footstep clusters are shown in black. | Pass |
| Trajectory matching | Footstep points are shown in brown in success matching. | Pass |
| Human trajectory generation | Man shape icon matches the human trajectory and footstep trajectories. | Pass |
| Save gait parameters | Files of gait parameters can be found in the given folder. | Pass |

2. Lidar Module Inspection

The inspection and test of the lidar module mainly focuses on checking whether the data uploaded to the cloud is intact and valid. After downloading the data, the main check is about the frequency of data, which is basically consistent with the scanning frequency of lidar. Then, data disorder is checked.

3. Verification of Human Tracking

The invention adopts the method from simple to difficult. Firstly, the research is carried out from the ideal laboratory environment, which is relatively easy. When certain effects are achieved, the data is collected in free living situation of older adults, which is relatively complex for testing and research.

3.1 Laboratory Evaluation

Figure 12:
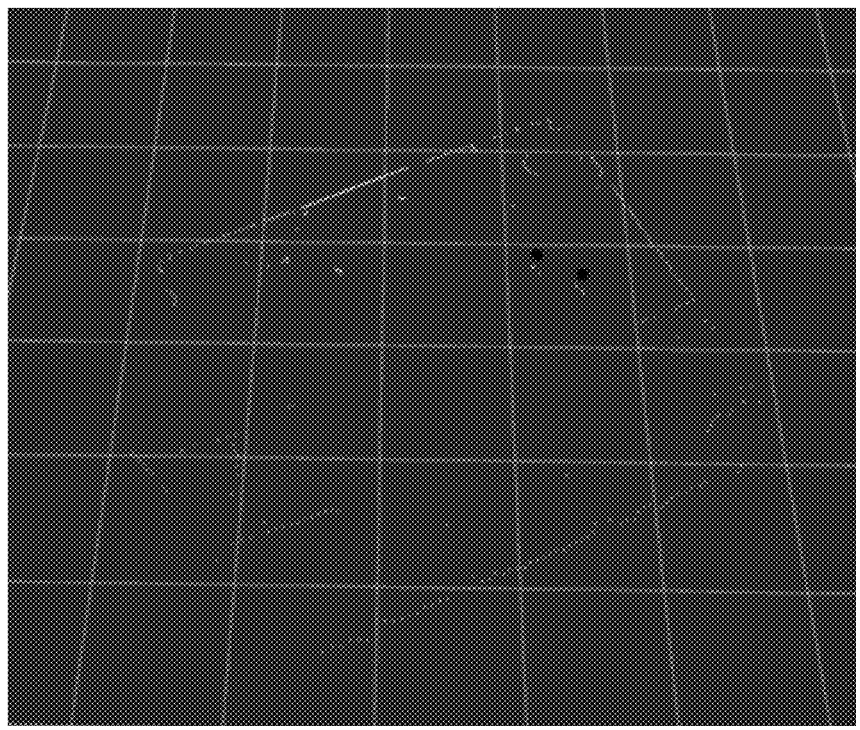
FIG. 12 is a schematic diagram of the laboratory environment provided in an embodiment of the present invention.
Figure 13:
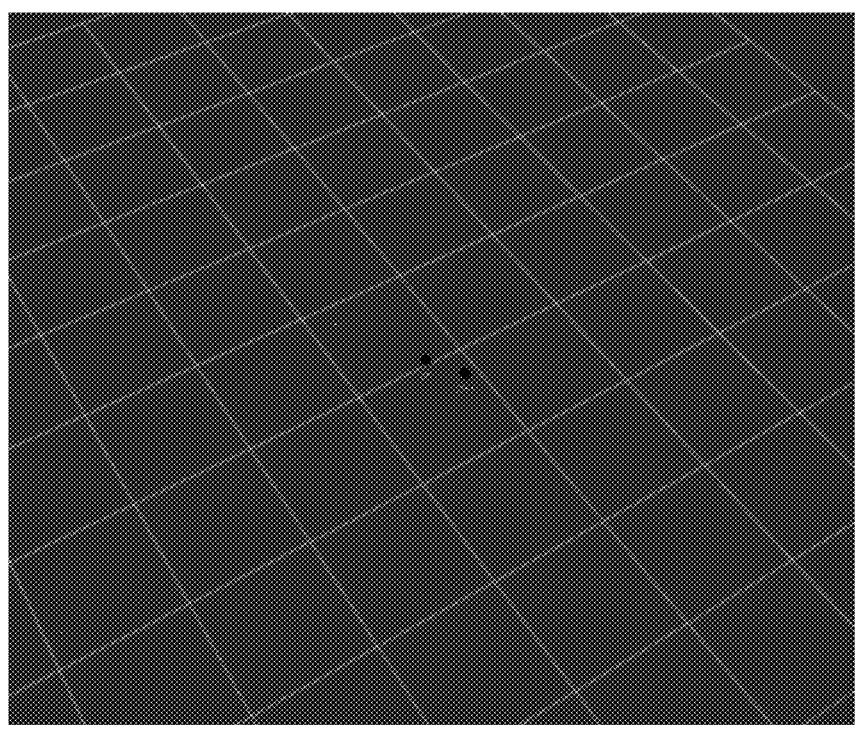
FIG. 13 is a schematic diagram of dynamic point extraction in laboratory provided in embodiments of the present invention.
Figure 14:
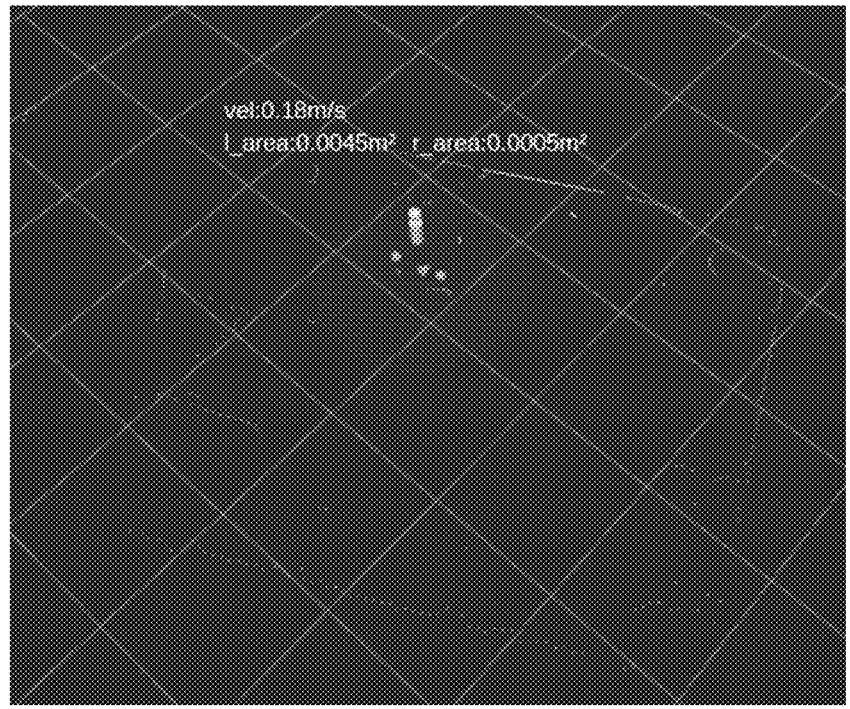
FIG. 14 is a schematic diagram of tracking in laboratory provided by an embodiment of the present invention.

In laboratory setting, the lidar was mounted under a sofa by the wall. The laboratory environment was with small amount of furniture, which means less obstacles for the lidar. In the experiment, one person walked in front of the sofa, continuously and irregularly. The laboratory environment is shown in FIG. 12. The result of dynamic extraction is shown in FIG. 13, it can be easily observed that, various static environment points are deleted, while points of obvious footsteps and sporadic noise are left. The target tracking results can be observed through ROS visualization, after the tracking process, as shown in FIG. 14. The experimental results show that, the human trajectory is relatively stable, without any outliers, although the footstep clusters become deformed and difficult to be recognized due to occlusion.

3.2 Free Living Situation Evaluation

In the free living situation, the lidar was mounted under a chair in the corner of room. Two older adults were recruited for the free living situation evaluation. They walked freely in the room, and their activities were not only limited to walking, but also some other activities, such as sitting, crouching, and sweeping the floor. The free living situation is complex, the space is narrow, and there are many obstacles. The visual angle of lidar is limited, various occlusion is serious, the walking state is not stable, and indoor activity is not limited to walking. In this scenario, the difficulty of identification and tracking increases significantly.

Figure 15:
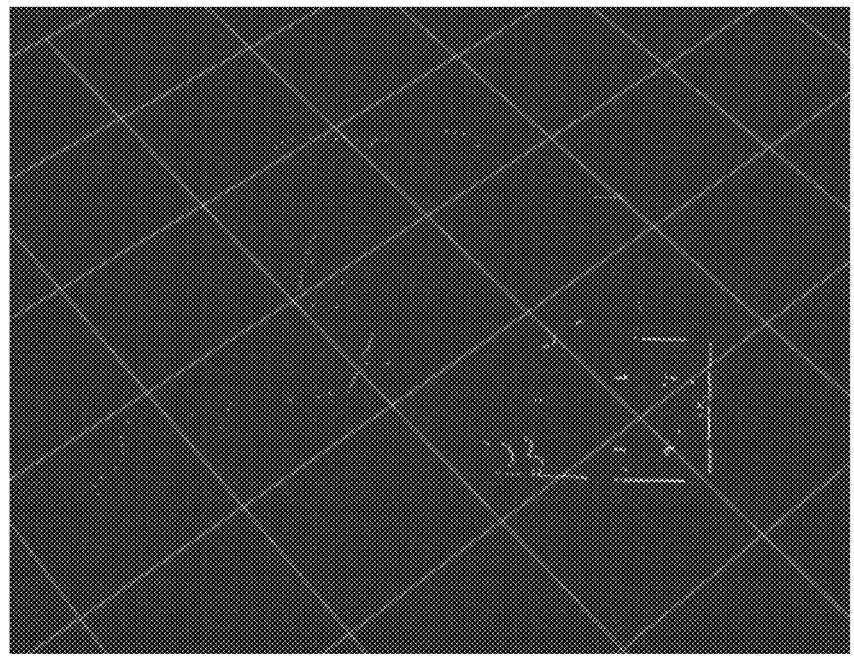
FIG. 15 is a schematic diagram of free living situation provided by an embodiment of the present invention.
Figure 16:
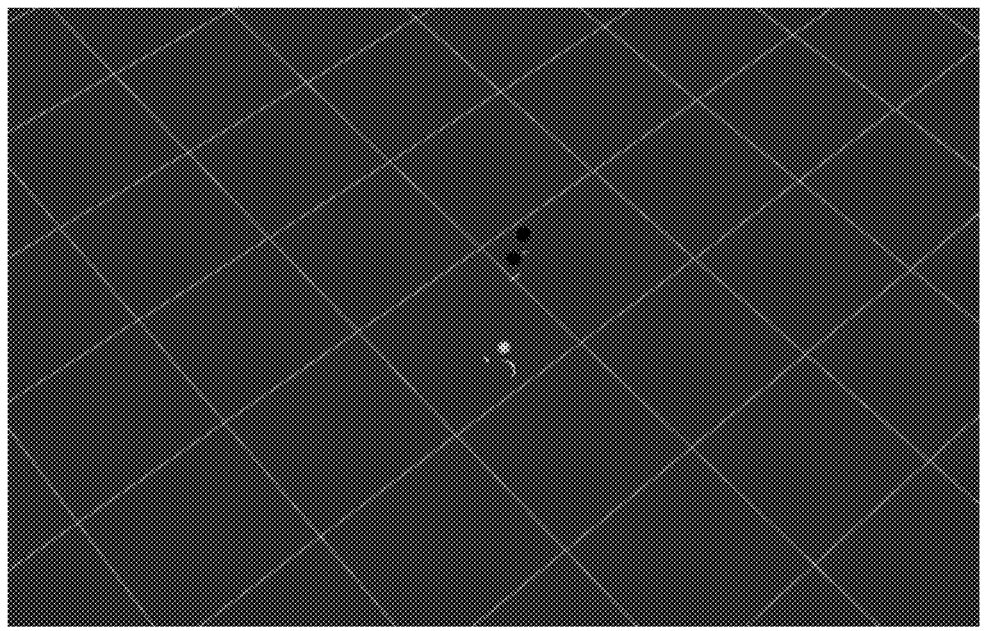
FIG. 16 is a schematic diagram of dynamic point extraction in free living situation provided by an embodiment of the present invention.
Figure 17:
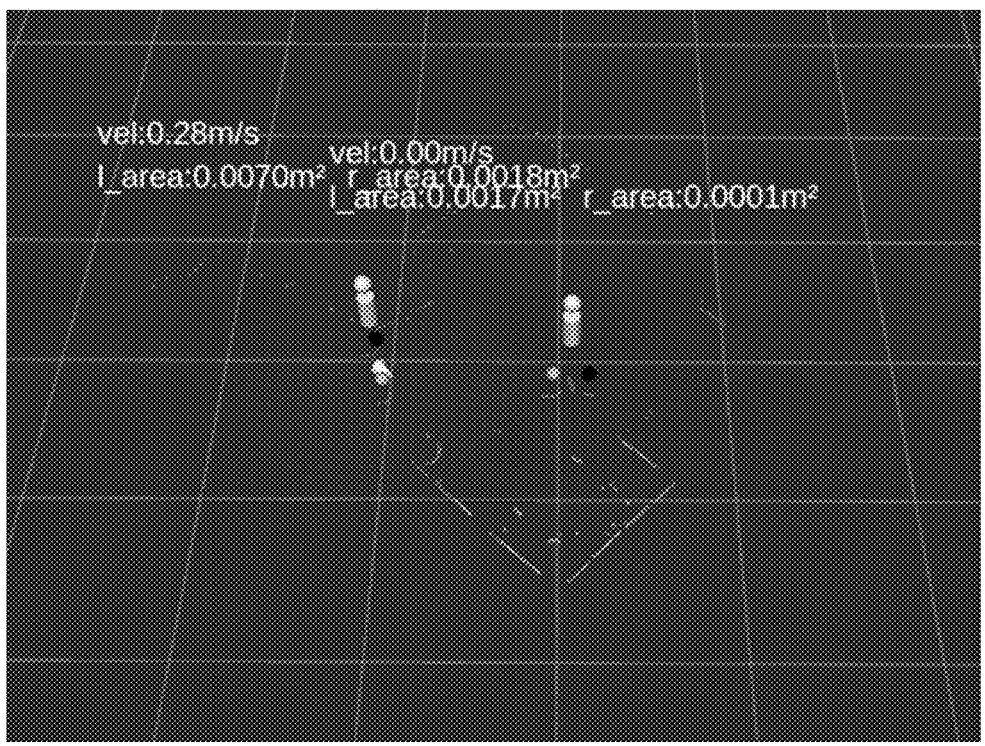
FIG. 17 is a schematic diagram of multi-target tracking in free living situation provided in an embodiment of the present invention.

FIG. 15 shows a free living environment, where the layout is more complicated than that of laboratory environment. However, the result of dynamic point extraction is relatively ideal, after constructing static environment map. The result of dynamic point extraction is shown in FIG. 16. Compared with the video of the corresponding period shot by indoor lens, the accuracy of footstep recognition and tracking is ideal, except for a few cases of lost or unrecognized.

The invention mainly briefly introduces the test and verification of the proposed system. Because the lidar used in this invention is a commercial product, the implementation and test of the lidar module is simply skimmed. The experiment of this invention is divided into two research and test stages. In the research stage, the individual test was carried out in an ideal laboratory environment. In the test stage, the evaluation and improvement was carried out in the complex free living situation of older adults. The present invention gives a simple and intuitive introduction to the specific test situation.

The present invention is a footstep recognition and walking tracking system, based on laser radar designed for the elderly at home. The invention comprehensively introduces the implementation scheme from the aspect of design and implementation. With this system, the users can remotely monitor the walking situation of the elderly at home, and obtain a series of gait parameters, which can be used for further analysis.

The invention is a part of a comprehensive monitoring platform for home care of the elderly. The direction of invention is to recognize human footsteps, track and analyze human walking, through the hardware device of laser radar. Lidar has some characteristics that other devices do not. In terms of stability, lidar works by obtaining the environmental location of plane information in the form of point cloud. Its data source and form is relatively single, but the reliability is strong, which is not affected by the environment light. In terms of performance, lidar is small in size and easy to arrange and use. Compared to identification tracking in the form of video analysis, lidar has less environmental constraints, which is easier to process, not with the privacy issue.

The invention adopts the mechanism of environment map, which not only makes the lidar applicable to various environments, but also the environment change, since the lidar can automatically update the environment map. With environmental map, the lidar is less affected by the surroundings, which can be used to analyze dynamic points and track footstep points accurately. The invention is optimized for complex free living environment and multi-target scene. The conditions of trajectory matching and multi-target tracking are more detailed and suitable to the actual scene. The position of incomplete human footsteps is predicted and filled to keep tracking. The system has strong operability and good portability. This system adopts ROS platform to transmit the scanning data of lidar. The data is stored in the cloud and can be downloaded remotely, ready-to-use. There is no need to transmit data in real time, while the scanning frequency of lidar can be calculated automatically according to the content of data files. The real-time transmission of lidar can be simulated by using file data instead of lidar, so that the remote analysis system can be used at any time. ROS platform also has strong adaptability to the lidar, which makes the system stable. The system can migrate to various Linux platforms.

It should be noticed that, embodiments of the invention may be realized by hardware, software or a combination of software and hardware. The hardware part can be realized by special logic. The software portion can be stored in memory and executed by an appropriate instruction execution system, such as a microprocessor or specially designed hardware. Ordinary technicians in the field can understand that the above devices and methods can be implemented using computer executable instructions and/or contained in processor control code, Such codes are provided, for example, on carrier media such as disks, CD or DVD, programmable storage such as read-only memory (firmware), or data carriers such as optical or electronic signal carriers. Equipment and module of the present invention can be caused by such as very large scale integrated circuit or gate array, such as logic chip, transistor, semiconductor, or such as field programmable gate array, programmable logic devices such as the hardware circuit of the hardware of the programmable implementation, also can be used by the various types of processor execution of software implementation. It can also be implemented by a combination of the above hardware circuits and software such as firmware.

Above, only for the specific implementation of the present invention, but the protection scope of the present invention is not limited to. Any familiar with this technology in the field of technical personnel within the scope of the present invention reveal, all within the spirits and principles of the present invention for any modification, equivalent replacement and improvement etc, should be covered within the scope of protection of the present invention.

What is claimed is:

1. A multi-target detection and tracking method, comprising:
    performing a lidar scanning on a surrounding environment, collecting point cloud data, transferring the point cloud data collected to an edge server, and then uploading, by a server, the cloud point data from the edge server to a cloud;
    after obtaining the point cloud data, extracting footstep points through a dynamic point extraction, a point clustering, and a random forest prediction, respectively, to obtain predicted walking information, wherein footstep is tracked by using trajectory matching;

after processing the point cloud data and obtaining the predicted walking information, releasing processing results to a user in a visual form when a walking trajectory is detected, wherein relevant walking information is output and stored in files, including a walking speed and a footstep length.

2. The multi-target detection and tracking method of claim 1, further comprising saving range data from the lidar scanning into the files, wherein raw data and processed data are downloadable by the user from the cloud through a smart gateway.

3. The multi-target detection and tracking method of claim 1, wherein a clustering method is required for the dynamic point extraction, wherein point clusters satisfy individual distribution, and the clustering method comprises the following steps:
  analyzing a central point of each of the point clusters to obtain target points;
  employing a machine learning model to identify the footstep points;
  after the footstep points are identified, extracting the footstep points from the point cloud; using a tracking algorithm to track the walking trajectory and obtain a latest state of each footstep of the footstep points; combining the latest state of the each footstep with previous status information of the each footstep, using a Kalman filter to update a best prediction of each of the point clusters;
  merging walking trajectories of right foot and left foot into one human trajectory for a display purpose.

4. The multi-target detection and tracking method of claim 1, wherein a lidar ranging core of the lidar scanning rotates clockwise to achieve a comprehensive scan of the surrounding environment and obtain a 2D point cloud of the surrounding environment, wherein a lidar for the lidar scanning is placed against a wall on a power adapter, so that a scan view of the lidar is enlarged to capture a movement of foot in walking;
  a reception and uploading of lidar data are implemented by using Rosbridge service, wherein a first Raspberry Pi computer running the Rosbridge service with specified ROS port is considered as the edge server; meanwhile, a client program running on a second Raspberry Pi computer connects to a corresponding ROS port to receive a corresponding ROS message topic; wherein range data is published as topic and the range data published is formatted into JSON; the range data is then saved into the files, and the files are named after time and uploaded to the cloud;
  wherein lidar raw data and processed data are downloadable from the cloud through a smart gateway, and the smart gateway runs a JavaSpringBoot based web server program, wherein a downloading process comprises arousing the smart gateway, opening a download web page, and choosing a data type and a data time.

5. The multi-target detection and tracking method of claim 1, wherein the point cloud data is downloaded and processed by identification and tracking algorithms as follows:
  1) Lidar data analysis, wherein a scanning frame contains 360 points, and the points are obstacles encountered by lidar lasers, wherein the lidar emits a laser every 1°; point location information is a range array in a float type representing a distance value of each obstacle encountered, the range array preserves a distance between each point and a center of the scanning frame, wherein the distance is in meter unit; an increasing emission angle is implied in an order of the range array; a frequency of the lidar represents a number of the scanning frame every second; and the frequency is 6 Hz meaning 6 scanning frames every second;
  wherein according to a conversion rule from a polar coordinate to a rectangular coordinate, range data is converted to position information in the rectangular coordinate, by using formula $$\begin{cases} x = \rho \cdot \cos\theta \\ y = \rho \cdot \sin\theta \end{cases},$$

where (x, y) is the position information in the rectangular coordinate, and ($\rho$, $\theta$) is position information in the polar coordinate, and each frame of the range data is published to a corresponding ROS node for subsequent analysis;
  2) The dynamic point extraction, wherein dynamic points are extracted by using the following procedure: comparing the range data frame by frame, calculating a distance difference of the 360 points for adjacent frames, calculating a distance difference sum of the 360 points, and calculating a mean value of the difference sum in a given period of time, wherein within the given period of time, the range data of the surrounding environment is considered as static when the mean value is smaller than a given threshold; then, saving the range data in the given period of time as static environment map for further use; meanwhile, the edge server keeps getting range data from the lidar; a frame difference algorithm keeps checking whether the surrounding environment is stationary as the range data accumulates, if the surrounding environment stays static, the surrounding map is updated per hour to avoid a measurement drift;
  3) The point clustering: employing a density clustering procedure to connect all adjacent points with high density into a point cloud, wherein clouds with different densities are separated into different clusters; after the density clustering procedure, clusters with small number of points are removed for computational efficiency; wherein for each frame, the range data is processed by using the dynamic point extraction and the point clustering procedure, the obtained dynamic point cloud is given a domain parameter and saved as sample sets; processing the sample sets by DBSCAN clustering to remove small clusters, and obtain several point clusters for each frame;
  4) Extracting a point cloud feature: after the point clustering, the point clusters obtained are considered as footstep candidates, waiting for a footstep tracking; and before the footstep tracking, several footstep features are designed for a footstep identification, as follows:
    i) a cluster central point, wherein the cluster central point is a representative point of all points in a corresponding point cluster, and the central point is defined as a coordinate average of all the points in the corresponding point cluster;
    ii) a cluster distance range, wherein a length of human foot varies within a reasonable range of 0.14 m, and the cluster distance range is defined as:

$F_d = |p - p_c| < 0.14$ m, wherein |•| is $L_2$ norm, p=(x, y) represents a point in the corresponding point cluster, x and y are the coordinates, $p_c$ is the cluster central point; when the cluster distance range is smaller than 0.14 m, the corresponding point cluster is regarded as a foot candidate;

iii) the footstep length: the footstep length links two steps in a walking and is defined as following:

$$F_l = \max_{\forall f,b} |p_f - p_b|,$$

wherein $p_f$ and $P_b$ are two arbitrary points in two point clusters of two adjacent frames, and $F_l$ is roughly assumed as a largest distance between the two point clusters of the two adjacent frames;

iv) a foot arc: the lidar captures a foot silhouette in one direction, the point cluster of the foot silhouette is assumed to have an arc shape and is defined as a mean value of an adjacent radian in the point cluster of the foot silhouette, as follows:

$$F_c = \frac{1}{n-1}\sum_{i=2}^{n} a\cos\frac{|p_i - p_c|^2 + |p_{i-1} - p_c|^2 - |p_i - p_{i-1}|^2}{2|p_i - p_c|\cdot|p_{i-1} - p_c|},$$

wherein $p_i$ and $p_{i-1}$ are two adjacent points in the point cluster of the foot silhouette, $p_c$ is a cluster center, n is a point number in the point cluster of the foot silhouette;

v) a foot arc length: a total length of the foot silhouette is defined as the foot arc length, as follows:

$$F_a = \sum_{i=2}^{n} |p_i - p_{i-1}|,$$

wherein $p_i$ and $p_{i-1}$ are two adjacent points in the point cluster of the foot silhouette;

5) using a random forest model for the footstep identification, comprising: after extracting the dynamic points, feeding each point cluster into the random forest model to identify the footsteps from other objects by using the several footstep features obtained in step 4, wherein, an output of the random forest model after the feeding comprises two classes of foot and non-foot; and publishing the identification results on corresponding nodes for subsequent processing.

6. The multi-target detection and tracking method of claim 1, wherein the trajectory matching maintains a tracking trajectory for each tracking target by the following steps:

as footstep information is exposed on one node, using a footstep location to update the tracking trajectory; by matching the footstep information with each tracking trajectory, constructing an overhead matrix to preserve a Mahalanobis distance between the footstep location and each tracking trajectory;

wherein the overhead matrix represents a possibility of the footstep belongs to the trajectories, the smaller the Mahalanobis distance in the overhead matrix is, the larger the possibility represents;

optimizing the overhead matrix to maintain local minimum by assigning each footstep to the tracking trajectory; after the assigning, assigning the remaining footsteps to new tracking trajectories;

feeding the footstep information with the assigned tracking trajectory into a Kalman filter to update the footstep information, then removing trajectories with low confidence coefficient to obtain left and right footstep trajectories;

registering the left and right footstep trajectories to each other for footstep-track matching to generate target human trajectories, wherein the left and right footstep trajectories fine tune each other in the footstep-track matching;

releasing information of target trajectories and the footstep trajectories on a corresponding node, wherein trajectories and gait parameters are shown in a visual form;

wherein, the footstep-track matching is described as follows: the Mahalanobis distance is a correction of an Euclidean distance to correct related problems of inconsistent dimension in the Euclidean distance; for two footstep trajectories waiting for a matching, point clouds of the two footstep trajectories obey the same distribution, and a deviation of an associated covariance matrix is defined as the Mahalanobis distance between the two footstep trajectories, as follows:

$$D_M(x,y) = \sqrt{(x-y)^T \Sigma^{-1}(x-y)},$$

wherein x and y represent two random points of the two footstep trajectories, $\Sigma$ is the associated covariance matrix;

(2) a Kalman filter state update process comprises constructing the footstep tracking as a dynamic system, wherein a status of the footstep tracking is updated by using the Kalman filter, and the Kalman filter state update process is described as follows:

$$X_k = A_k X_{k-1} + B_k u_k + w_k,$$

$$z_k = H_k X_k + v_k$$

wherein X presents a footstep status in the tracking trajectory, $X_k = [x_k, y_k, x_k', y_k']$ is a centroid state vector of one tracking trajectory in frame k, the Kalman model updates the status of the footstep tracking every scanning frame, k and k−1 present two adjacent frames; A is a state transfer matrix; B is an input control matrix, mapping the walking information into a state transfer vector; u is a system control vector, including acceleration information of the footstep; w is a process noise; H is a transition matrix, mapping the state transfer vector to a measurement space of Mahalanobis space; and v is an observation noise.

7. A non-transitory readable storage medium, storing the multi-target detection and tracking method of claim 1 in a program executed by a processor, wherein execution steps are performed as follows:

the lidar scans the surrounding environment into the point cloud data;

a gateway transfers the point cloud data to the edge server; and the edge server uploads the point cloud data to a cloud storage;

with the point cloud data obtained, footstep points are extracted and tracked by going through the dynamic point extraction, the point clustering, a point cloud feature extraction, a random forest identification, a multi-target detection and tracking, a footstep-track matching, and a Kalman filter updating;

with the cloud point data processed, gait information is obtained and is then published to the user in the visual form; meanwhile, as human is detected, corresponding gait information is output and stored in the files, including the walking speed and the footstep length.

8. A multi-target detection and tracking system implementing the multi-target detection and tracking method of claim 1, wherein the multi-target detection and tracking system comprises:
a lidar module, including an operation of a lidar for lidar drive and uploading of acquired data;
a data acquisition module, used to obtain the point cloud data and download acquisition using a smart gateway download platform;
a data processing module, for a processing analysis of the point cloud data, and a presentation of processing results.

9. The multi-target detection and tracking system of claim 8, further comprising a first Raspberry Pi computer, wherein
the first Raspberry Pi computer drives the lidar and makes the lidar a raw data source;
the first Raspberry Pi computer opens a rosbridge-server port, runs "client" program to establish connection with a ROS node published by the lidar, and obtains raw data through ROS message named "scan";
wherein the raw data is transferred to the edge server of the second Raspberry Pi computer, and then uploaded to a MinIO cloud;
wherein the user operates the multi-target detection and tracking system for a gait analysis by choosing a time period of required data;
the multi-target detection and tracking system runs on a host PC, downloads the required data and processes the required data by using the multi-target detection and tracking method; the walking parameters are then obtained and used for visual display of tracking result.

10. An information data processing terminal, wherein the information data processing terminal is used for implementing the multi-target detection and tracking method of claim 1; and the information data processing terminal comprises: a footstep recognition terminal, a human detection terminal, an intelligent monitoring terminal, and an elderly walking monitoring terminal.

11. The multi-target detection and tracking system of claim 8, wherein the multi-target detection and tracking method further comprises:
saving range data from the lidar scanning into the files, wherein raw data and processed data are downloadable by the user from the cloud through a smart gateway.

12. The multi-target detection and tracking system of claim 8, wherein
a clustering method is required for the dynamic point extraction, wherein point clusters satisfy individual distribution, and the clustering method comprises the following steps:
analyzing a central point of each of the point clusters to obtain target points;
employing a machine learning model to identify the footstep points;
after the footstep points are identified, extracting the footstep points from the point cloud; using a tracking algorithm to track the walking trajectory and obtain a latest state of each footstep of the footstep points; combining the latest state of the each footstep with previous status information of the each footstep, using a Kalman filter to update a best prediction of each of the point clusters;
merging walking trajectories of right foot and left foot into one human trajectory for a display purpose.

13. The multi-target detection and tracking system of claim 8, wherein a lidar ranging core of the lidar scanning rotates clockwise to achieve a comprehensive scan of the surrounding environment and obtain a 2D point cloud of the surrounding environment, wherein a lidar for the lidar scanning is placed against a wall on a power adapter, so that a scan view of the lidar is enlarged to capture a movement of foot in walking;
a reception and uploading of lidar data are implemented by using Rosbridge service, wherein a first Raspberry Pi computer running the Rosbridge service with specified ROS port is considered as the edge server; meanwhile, a client program running on a second Raspberry Pi computer connects to a corresponding ROS port to receive a corresponding ROS message topic; wherein lidar range data is published as topic and the range data published is formatted into JSON; the range data is then saved into the files, and the files are named after time and uploaded to the cloud;
wherein lidar raw data and processed data are downloadable from the cloud through a smart gateway, and the smart gateway runs a JavaSpringBoot based web server program, wherein a downloading process comprises arousing the smart gateway, opening a download web page, and choosing a data type and a data time.

14. The multi-target detection and tracking system of claim 8, wherein the point cloud data is downloaded and processed by identification and tracking algorithms as follows:
1) lidar data analysis, wherein a scanning frame contains 360 points, and the points are obstacles encountered by lidar lasers, wherein the lidar emits a laser every 1°; point location information is a range array in a float type representing a distance value of each obstacle encountered; the range array preserves a distance between each point and a center of a scanning frame, wherein the distance is in meter unit; an increasing emission angle is implied in an order of the range array; a frequency of the lidar represents a number of the scanning frame every second; and the frequency is 6 Hz meaning 6 scanning frames every second;
wherein according to a conversion rule from a polar coordinate to a rectangular coordinate, range data is converted to position information in the rectangular coordinate, by using formula $$\begin{cases} x = \rho \cdot \cos\theta \\ y = \rho \cdot \sin\theta \end{cases},$$

where (x, y) is the position information in the rectangular coordinate, and (ρ, θ) is position information in the polar coordinate, and each frame of the range data is published to a corresponding ROS node for subsequent analysis;
2) the dynamic point extraction, wherein dynamic points are extracted by using the following procedure: comparing the range data frame by frame, calculating a distance difference of the 360 points for adjacent frames, calculating a distance difference sum of the 360 points, and calculating a mean value of the difference sum in a given period of time, wherein within the given period of time, the range data of the surrounding environment is considered as static when the mean value is smaller than a given threshold; then, saving the range data in the given period of time as static environment map for further use; meanwhile, the edge server keeps getting range data from the lidar; a frame difference algorithm keeps checking whether the surrounding environment is stationary as the range data accumulates, if the surrounding environment stays static, the surrounding map is updated per hour to avoid a measurement drift;

3) the point clustering: employing a density clustering procedure to connect all adjacent points with high density into a point cloud, wherein clouds with different densities are separated into different clusters; after the density clustering procedure, clusters with small number of points are removed for computational efficiency; wherein for each frame, the range data is processed by using the dynamic point extraction and the point clustering procedure, the obtained dynamic point cloud is given a domain parameter and saved as sample sets; processing the sample sets by DBSCAN clustering to remove small clusters, and obtain several point clusters for each frame;

4) extracting a point cloud feature: after the point clustering, the point clusters obtained are considered as footstep candidates, waiting for a footstep tracking; and before the footstep tracking, several footstep features are designed for a footstep identification, as follows:
   i) a cluster central point, wherein the cluster central point is a representative point of all points in a corresponding point cluster, and the central point is defined as a coordinate average of all the points in the corresponding point cluster;
   ii) a cluster distance range, wherein a length of human foot varies within a reasonable range of 0.14 m, and the cluster distance range is defined as:

$$F_d = |p - p_c| < 0.14 \text{ m},$$

wherein $|\cdot|$ is $L_2$ norm, $p=(x, y)$ represents a point in the corresponding point cluster, x and y are the coordinates, $p_c$ is the cluster central point; when the cluster distance range is smaller than 0.14 m, the corresponding point cluster is regarded as a foot candidate;
   iii) the footstep length: the footstep length links two steps in a walking and is defined as following:

$$F_l = \max_{\forall f, b} |p_f - p_b|,$$

wherein $p_f$ and $P_b$ are two arbitrary points in two point clusters of two adjacent frames, and $F_l$ is roughly assumed as a largest distance between the two point clusters of the two adjacent frames;
   iv) a foot arc: the lidar captures a foot silhouette in one direction, the point cluster of the foot silhouette is assumed to have an arc shape and is defined as a mean value of an adjacent radian in the point cluster of the foot silhouette, as follows:

$$F_c = \frac{1}{n-1} \sum_{i=2}^{n} a \cos \frac{|p_i - p_c|^2 + |p_{i-1} - p_c|^2 - |p_i - p_{i-1}|^2}{2|p_i - p_c| \cdot |p_{i-1} - p_c|},$$

wherein $p_i$ and $p_{i-1}$ are two adjacent points in the point cluster of the foot silhouette, $p_c$ is a cluster center, n is a point number in the point cluster of the foot silhouette;

v) a foot arc length: a total length of the foot silhouette is defined as the foot arc length, as follows:

$$F_a = \sum_{i=2}^{n} |p_i - p_{i-1}|,$$

wherein $p_i$ and $p_{i-1}$ are two adjacent points in the point cluster of the foot silhouette;

5) using a random forest model for the footstep identification, comprising: after extracting the dynamic points, feeding each point cluster into the random forest model to identify the footsteps from other objects by using the several footstep features obtained in step 4, wherein, an output of the random forest model after the feeding comprises two classes of foot and non-foot; and publishing the identification results on corresponding nodes for subsequent processing.

15. The multi-target detection and tracking system of claim 8, wherein in the multi-target detection and tracking method, wherein the trajectory matching maintains a tracking trajectory for each tracking target by the following steps:
   as footstep information is exposed on one node, using a footstep location to update the tracking trajectory; by matching the footstep information with each tracking trajectory, constructing an overhead matrix to preserve a Mahalanobis distance between the footstep location and each tracking trajectory;
   wherein the overhead matrix represents a possibility of the footstep belongs to the trajectories, the smaller the Mahalanobis distance in the overhead matrix is, the larger the possibility represents;
   optimizing the overhead matrix to maintain local minimum by assigning each footstep to the tracking trajectory; after the assigning, assigning the remaining footsteps to new tracking trajectories;
   feeding the footstep information with the assigned tracking trajectory into a Kalman filter to update the footstep information, then removing trajectories with low confidence coefficient to obtain left and right footstep trajectories;
   registering the left and right footstep trajectories to each other for footstep-track matching to generate target human trajectories, wherein the left and right footstep trajectories fine tune each other in the footstep-track matching;
   releasing information of target trajectories and the footstep trajectories on a corresponding node, wherein trajectories and gait parameters are shown in a visual form;
   wherein,
   the footstep-track matching is described as follows: the Mahalanobis distance is a correction of an Euclidean distance to correct related problems of inconsistent dimension in the Euclidean distance; for two footstep trajectories waiting for a matching, point clouds of the two footstep trajectories obey the same distribution, and a deviation of an associated covariance matrix is defined as the Mahalanobis distance between the two footstep trajectories, as follows:

$$D_M(x,y) = \sqrt{(x-y)^T \Sigma^{-1} (x-y)},$$

wherein x and y represent two random points of the two footstep trajectories, $\Sigma$ is the associated covariance matrix;

(2) a Kalman filter state update process comprises constructing the footstep tracking as a dynamic system, wherein a status of the footstep tracking is updated by using the Kalman filter, and the Kalman filter state update process is described as follows:

$$X_k = A_k X_{k-1} + B_k u_k + w_k,$$

$$Z_k = H_k X_k + v_k$$

wherein X presents a footstep status in the tracking trajectory, $X_k=[x_k, y_k, x_k', y_k']$ is a centroid state vector of one tracking trajectory in frame k, the Kalman model updates the status of the footstep tracking every scanning frame, k and k−1 present two adjacent frames; A is a state transfer matrix; B is an input control matrix, mapping the walking information into a state transfer vector; u is a system control vector, including acceleration information of the footstep; w is a process noise; H is a transition matrix, mapping the state transfer vector to a measurement space of Mahalanobis space; and v is an observation noise.

16. The information data processing terminal of claim 10, wherein the multi-target detection and tracking method further comprises: saving range data from the lidar scanning into the files, wherein raw data and processed data are downloadable by the user from the cloud through a smart gateway.

17. The information data processing terminal of claim 10, wherein
a clustering method is required for the dynamic point extraction, wherein point clusters satisfy individual distribution, and the clustering method comprises the following steps:
analyzing a central point of each of the point clusters to obtain target points;
employing a machine learning model to identify the footstep points;
after the footstep points are identified, extracting the footstep points from the point cloud; using a tracking algorithm to track the walking trajectory and obtain a latest state of each footstep of the footstep points; combining the latest state of the each footstep with previous status information of the each footstep, using a Kalman filter to update a best prediction of each of the point clusters;
merging walking trajectories of right foot and left foot into one human trajectory for a display purpose.

18. The information data processing terminal of claim 10, wherein a lidar ranging core of the lidar scanning rotates clockwise to achieve a comprehensive scan of the surrounding environment and obtain a 2D point cloud of the surrounding environment, wherein a lidar for the lidar scanning is placed against a wall on a power adapter, so that a scan view of the lidar is enlarged to capture a movement of foot in walking;
a reception and uploading of lidar data are implemented by using Rosbridge service, wherein a first Raspberry Pi computer running the Rosbridge service with specified ROS port is considered as the edge server; meanwhile, a client program running on a second Raspberry Pi computer connects to a corresponding ROS port to receive a corresponding ROS message topic; wherein lidar range data is published as topic and the range data published is formatted into JSON; the range data is then saved into the files, and the files are named after time and uploaded to the cloud;
wherein lidar raw data and processed data are downloadable from the cloud through a smart gateway, and the smart gateway runs a JavaSpringBoot based web server program, wherein a downloading process comprises arousing the smart gateway, opening a download web page, and choosing a data type and a data time.

19. The information data processing terminal of claim 10, wherein the point cloud data is downloaded and processed by identification and tracking algorithms as follows:
1) lidar data analysis, wherein a scanning frame contains 360 points, and the points are obstacles encountered by lidar lasers, wherein the lidar emits a laser every 1°; point location information is a range array in a float type representing a distance value of each obstacle encountered; the range array preserves a distance between each point and a center of a scanning frame, wherein the distance is in meter unit; an increasing emission angle is implied in an order of the range array; a frequency of the lidar represents a number of the scanning frame every second; and the frequency is 6 Hz meaning 6 scanning frames every second;
wherein according to a conversion rule from a polar coordinate to a rectangular coordinate, range data is converted to position information in the rectangular coordinate, by using formula $$\begin{cases} x = \rho \cdot \cos\theta \\ y = \rho \cdot \sin\theta \end{cases},$$

where (x, y) is the position information in the rectangular coordinate, and (ρ, θ) is position information in the polar coordinate, and each frame of the range data is published to a corresponding ROS node for subsequent analysis;
2) the dynamic point extraction, wherein dynamic points are extracted by using the following procedure: comparing the range data frame by frame, calculating a distance difference of the 360 points for adjacent frames, calculating a distance difference sum of the 360 points, and calculating a mean value of the difference sum in a given period of time, wherein within the given period of time, the range data of the surrounding environment is considered as static when the mean value is smaller than a given threshold; then, saving the range data in the given period of time as static environment map for further use; meanwhile, the edge server keeps getting range data from the lidar; a frame difference algorithm keeps checking whether the surrounding environment is stationary as the range data accumulates, if the surrounding environment stays static, the surrounding map is updated per hour to avoid a measurement drift;
3) the point clustering: employing a density clustering procedure to connect all adjacent points with high density into a point cloud, wherein clouds with different densities are separated into different clusters; after the density clustering procedure, clusters with small number of points are removed for computational efficiency; wherein for each frame, the range data is processed by using the dynamic point extraction and the point clustering procedure, the obtained dynamic point cloud is given a domain parameter and saved as sample sets; processing the sample sets by DBSCAN clustering to remove small clusters, and obtain several point clusters for each frame;

4) extracting a point cloud feature: after the point clustering, the point clusters obtained are considered as footstep candidates, waiting for a footstep tracking; and before the footstep tracking, several footstep features are designed for a footstep identification, as follows:
   i) a cluster central point, wherein the cluster central point is a representative point of all points in a corresponding point cluster, and the central point is defined as a coordinate average of all the points in the corresponding point cluster;
   ii) a cluster distance range, wherein a length of human foot varies within a reasonable range of 0.14 m, and the cluster distance range is defined as:

$$F_d = |p - p_c| < 0.14 \text{ m},$$

wherein $|\cdot|$ is $L_2$ norm, $p = (x, y)$ represents a point in the corresponding point cluster, x and y are the coordinates, $p_c$ is the cluster central point; when the cluster distance range is smaller than 0.14 m, the corresponding point cluster is regarded as a foot candidate;
   iii) the footstep length: the footstep length links two steps in a walking and is defined as following:

$$F_l = \max_{\forall f,b} |p_f - p_b|,$$

wherein $p_f$ and $P_b$ are two arbitrary points in two point clusters of two adjacent frames, and $F_l$ is roughly assumed as a largest distance between the two point clusters of the two adjacent frames;
   iv) a foot arc: the lidar captures a foot silhouette in one direction, the point cluster of the foot silhouette is assumed to have an arc shape and is defined as a mean value of an adjacent radian in the point cluster of the foot silhouette, as follows:

$$F_c = \frac{1}{n-1} \sum_{i=2}^{n} a\cos \frac{|p_i - p_c|^2 + |p_{i-1} - p_c|^2 - |p_i - p_{i-1}|^2}{2|p_i - p_c| \cdot |p_{i-1} - p_c|},$$

wherein $p_i$ and $p_{i-1}$ are two adjacent points in the point cluster of the foot silhouette, $p_c$ is a cluster center, n is a point number in the point cluster of the foot silhouette;
   v) a foot arc length: a total length of the foot silhouette is defined as the foot arc length, as follows:

$$F_a = \sum_{i=2}^{n} |p_i - p_{i-1}|,$$

wherein $p_i$ and $p_{i-1}$ are two adjacent points in the point cluster of the foot silhouette;
5) using a random forest model for the footstep identification, comprising: after extracting the dynamic points, feeding each point cluster into the random forest model to identify the footsteps from other objects by using the several footstep features obtained in step 4, wherein, an output of the random forest model after the feeding comprises two classes of foot and non-foot; and publishing the identification results on corresponding nodes for subsequent processing.

20. The information data processing terminal of claim 10, wherein in the multi-target detection and tracking method, wherein the trajectory matching maintains a tracking trajectory for each tracking target by the following steps:
   as footstep information is exposed on one node, using a footstep location to update the tracking trajectory; by matching the footstep information with each tracking trajectory, constructing an overhead matrix to preserve a Mahalanobis distance between the footstep location and each tracking trajectory;
   wherein the overhead matrix represents a possibility of the footstep belongs to the trajectories, the smaller the Mahalanobis distance in the overhead matrix is, the larger the possibility represents;
   optimizing the overhead matrix to maintain local minimum by assigning each footstep to the tracking trajectory; after the assigning, assigning the remaining footsteps to new tracking trajectories;
   feeding the footstep information with the assigned tracking trajectory into a Kalman filter to update the footstep information, then removing trajectories with low confidence coefficient to obtain left and right footstep trajectories;
   registering the left and right footstep trajectories to each other for footstep-track matching to generate target human trajectories, wherein the left and right footstep trajectories fine tune each other in the footstep-track matching;
   releasing information of target trajectories and the footstep trajectories on a corresponding node, wherein trajectories and gait parameters are shown in a visual form;
   wherein,
   the footstep-track matching is described as follows: the Mahalanobis distance is a correction of an Euclidean distance to correct related problems of inconsistent dimension in the Euclidean distance; for two footstep trajectories waiting for a matching, point clouds of the two footstep trajectories obey the same distribution, and a deviation of an associated covariance matrix is defined as the Mahalanobis distance between the two footstep trajectories, as follows:

$$D_M(x,y) = \sqrt{(x-y)^T \Sigma^{-1} (x-y)},$$

wherein x and y represent two random points of the two footstep trajectories, $\Sigma$ is the associated covariance matrix;
   (2) a Kalman filter state update process comprises constructing the footstep tracking as a dynamic system, wherein a status of the footstep tracking is updated by using the Kalman filter, and the Kalman filter state update process is described as follows:

$$X_k = A_k X_{k-1} + B_k u_k + w_k,$$

$$z_k = H_k X_k + v_k$$

wherein X presents a footstep status in the tracking trajectory, $X_k = [x_k, y_k, x_k', y_k']$ is a centroid state vector of one tracking trajectory in frame k, the Kalman model updates the status of the footstep tracking every scanning frame, k and k−1 present two adjacent frames; A is a state transfer matrix; B is an input control matrix, mapping the walking information into a state transfer vector; u is a system control vector, including acceleration information of the footstep; w is a process noise; H is a transition matrix, mapping the state transfer vector to a measurement space of Mahalanobis space; and v is an observation noise.

* * * * *